US011694029B2

(12) United States Patent
Malak et al.

(10) Patent No.: US 11,694,029 B2
(45) Date of Patent: Jul. 4, 2023

(54) NEOLOGISM CLASSIFICATION TECHNIQUES WITH TRIGRAMS AND LONGEST COMMON SUBSEQUENCES

(71) Applicant: ORACLE INTERNATIONAL CORPORATION, Redwood Shores, CA (US)

(72) Inventors: Michael Malak, Denver, CO (US); Luis E. Rivas, Denver, CO (US); Mark Lee Kreider, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 16/985,131

(22) Filed: Aug. 4, 2020

(65) Prior Publication Data
US 2021/0056264 A1    Feb. 25, 2021

Related U.S. Application Data

(60) Provisional application No. 62/888,998, filed on Aug. 19, 2019.

(51) Int. Cl.
| | |
|---|---|
| *G06F 40/279* | (2020.01) |
| *G06F 40/30* | (2020.01) |
| *G06N 3/0464* | (2023.01) |
| *G06F 40/284* | (2020.01) |
| *G06N 3/04* | (2023.01) |

(52) U.S. Cl.
CPC ............ *G06F 40/284* (2020.01); *G06N 3/04* (2013.01); *G06F 40/30* (2020.01)

(58) Field of Classification Search
CPC .... G06F 40/279; G06F 40/284; G06F 40/295; G06F 40/30; G06N 20/00; G06N 3/0464

USPC ............................... 704/1, 9; 706/12, 20, 15
See application file for complete search history.

(56) References Cited

U.S. PATENT DOCUMENTS 5,062,143 A * 10/1991 Schmitt ................. G06F 40/289
382/230
5,276,741 A * 1/1994 Aragon ................. G06F 40/232
382/229

(Continued)

OTHER PUBLICATIONS

Giannakopoulos, et al., Representation Models for Text Classification : A Comparative Analysis Over Three Web Document Types, Proceedings of the 2nd International Conference on Web Intelligence, Mining and Semantics, WIMS '12, Jan. 1, 2012, 12 pages.

(Continued)

*Primary Examiner* — Martin Lerner
(74) *Attorney, Agent, or Firm* — Kilpatrick Townsend & Stockton LLP

(57) ABSTRACT

Techniques are provided for identifying attributes associated with a neologism or an unknown word or name. Real world characteristics can be predicted for the neologism. Trigrams are identified for an input word and word embedding model vector values are calculated for the identified trigrams and entered into a matrix. Trigrams are identified for nearest names. Classification values are calculated based on the trigrams for the input word and the trigrams from the nearest names and the classification values are entered into the matrix. A convolutional neural network can process the matrix to identify one or more characteristics associated with the neologism.

20 Claims, 17 Drawing Sheets

(56) References Cited

U.S. PATENT DOCUMENTS

| | | | | |
|---|---|---|---|---|
| 6,272,456 | B1* | 8/2001 | de Campos | G06F 40/263 704/8 |
| 9,070,090 | B2 | 6/2015 | Ogren et al. | |
| 9,594,741 | B1* | 3/2017 | Thakurta | G06F 40/279 |
| 10,810,373 | B1* | 10/2020 | Pappu | G06F 40/30 |
| 2009/0055168 | A1* | 2/2009 | Wu | G06F 40/216 704/10 |
| 2009/0326927 | A1* | 12/2009 | Morin | G06F 40/274 704/10 |
| 2013/0246045 | A1* | 9/2013 | Ulanov | G06F 40/289 704/9 |
| 2016/0092557 | A1* | 3/2016 | Stojanovic | G06F 16/248 707/723 |
| 2016/0283583 | A1* | 9/2016 | Liu | G06F 40/284 |
| 2017/0270100 | A1* | 9/2017 | Audhkhasi | G06F 40/289 |
| 2018/0052823 | A1* | 2/2018 | Scally | G06F 40/284 |
| 2018/0341839 | A1* | 11/2018 | Malak | G06F 40/30 |
| 2019/0102441 | A1* | 4/2019 | Malak | G06F 16/285 |
| 2019/0251122 | A1* | 8/2019 | Rivas | G06F 40/18 |
| 2019/0294678 | A1* | 9/2019 | Sapugay | G06F 40/30 |
| 2019/0385014 | A1* | 12/2019 | Malak | G06F 40/194 |
| 2020/0134014 | A1* | 4/2020 | Tiwari | G06N 20/00 |
| 2020/0320068 | A1* | 10/2020 | Malak | G06F 16/26 |
| 2021/0234813 | A1* | 7/2021 | Narayan | G06F 40/30 |
| 2021/0319054 | A1* | 10/2021 | Glass | G06F 40/40 |

OTHER PUBLICATIONS

Hu, et al., Method and System for Gender Classification of Names using Character Based Machine Learning Models ED—Dari Kuhn, IP.com Inc., Sep. 23, 2019, 3 pages.

Malmasi, et al., A Data-driven Approach to Studying Given Names and their Gender and Ethnicity Associations, Proceedings of Australasian Language Technology Association Workshop 2014 (ALTA2014), Jan. 1, 2014, pp. 145-149.

Pudaruth, et al., Name-Centric Gender Inference Using Data Analytics, 2016 3rd International Conference on Soft Computing & Machine Intelligence (ISCMI), Nov. 23, 2016, pp. 124-127.

International Application No. PCT/US2020/045390, received an International Search Report and Written Opinion, dated Nov. 16, 2020, 13 pages.

Bojanowski, "A Library for Efficient Text Classification and Word Representation", Facebook, FastText, Available Online at http://www.lss.supelec.fr/scube/slides/piotr%20bojanowski.pdf#page=21, Nov. 23, 2016, 32 pages.

Bojanowski, "NLP Meetup #2-fastText", Youtube, Available Online at https://www.youtube.com/watch?v=CHcExDsDeHU&t=10m25s, Nov. 25, 2016, 2 pages.

Cover et al., "Nearest NeighborPattern Classification", IEEE Trans. Information Theory, vol. 13, No. 1, Jan. 1967, pp. 21-27.

Joulin et al., "Fasttext.Zip: Compressing Text Classification Models", Under Review as a Conference Paper at ICLR 2017, Available Online at https://arxiv.org/pdf/1612.03651.pdf, Dec. 12, 2016, pp. 1-13.

Kalchbrenner et al., "A Convolutional Neural Network for Modelling Sentences", Proceedings of the 52nd Annual Meeting of the Association for Computational Linguistics, Available Online at: https://arxiv.org/abs/1404.2188, Apr. 8, 2014, 11 pages.

Kou et al., "Automatic Labelling of Topic Models using Word Vectorsand Letter Trigram Vectors", Information Retrieval Technology, Available Online at http://citeseerx.ist.psu.edu/viewdoc/download?doi=10.1.1.722.5649&rep=rep1&type=pdf, 2015, pp. 1-12.

Mikolov et al., "Exploiting Similarities Among Languages for Machine Translation", Available Online at: http://arxiv.org/pdf/1309.4168.pdf, Sep. 17, 2013, 10 pages.

Smetanin, "Fuzzy String Search", Nikita's Blog, Search Algorithms, Software Development and so on, Available Online at: http://ntz-develop.blogspot.com/2011/03/fuzzy-string-search.html, Mar. 24, 2011, 32 pages.

Wagner et al., "The String-To-String Correction Problem", Journal of the Association for Computing Machinery, vol. 21, No. 1, Available Online at: http://www.inrg.csie.ntu.edu.tw/algorithm2014/homework/Wagner-74.pdf, Jan. 1974, pp. 168-173.

Yoon, Kim "Convolutional Neural Networks for Sentence Classification", dated Aug. 25, 2014, 6 pages.

"Keras/imdb_cnn.py at Master-Keras-Team/Keras", The Wayback Machine, GitHub, Nov. 9, 2017, 2 pages.

"Understanding Convolutional Neural Networks for NLP", Denny's Blog, Feb. 11, 2022, 15 pages.

Homma et al., "An Artificial Neural Network for Spatiotemporal Bipolar Patterns: Application to Phoneme Classification", Proceedings of the 1987 International Conference on Neural Information Processing Systems, 1988, pp. 31-40.

* cited by examiner w = "JOANNA"

$$M =$$

| | Word embedding model vectors (300 columns) | | | | Classifications | |
|---|---|---|---|---|---|---|
| ^JO | 0.3 | 0.5 | ⋯ | 0.1 | | |
| JOA | 0.6 | 0.2 | ⋯ | 0.2 | | |
| OAN | 0.1 | 0.1 | ⋯ | 0.0 | | |
| ANN | 0.9 | 0.3 | ⋯ | 0.4 | | |
| NNA | 1.0 | 0.6 | ⋯ | 0.4 | | |
| NA$ | 0.9 | 0.4 | ⋯ | 0.4 | | |
| | | | | | male | female | k = 3

---

S = {"JOANNE", "JOHN", "ANNA"}
wq = ^JO, JOA, OAN, ANN, NNA, NA$ $$Q =$$

| ^JO, JOA, OAN, ANN | JOANNE | female |
|---|---|---|
| ^JO | JOHN | male |
| ANN, NNA, NA$ | ANNA | female |

FIG. 4

$w_q = $ ^JO, JOA, OAN, ANN, NNA, NA$

FIG. 5

| | Word embedding model vectors (300 columns) | | | | Classifications | |
|---|---|---|---|---|---|---|
| ^JO | 0.3 | 0.5 | ... | 0.1 | | |
| JOA | 0.6 | 0.2 | ... | 0.2 | | |
| OAN | 0.1 | 0.1 | ... | 0.0 | | |
| ANN | 0.9 | 0.3 | ... | 0.5 | | |
| NNA | 1.0 | 0.6 | ... | 0.4 | | |
| NA$ | 0.9 | 0.4 | ... | 0.4 | | |

$M =$ $k = 3$ male / female

FIG. 6

S = {"JOANNE", "JOHN", "ANNE"}

FIG. 8

| | Word embedding model vectors (300 columns) | | | | Classifications | |
|---|---|---|---|---|---|---|
| | | | | | male | female |
| ^JO | 0.3 | 0.5 | ... | 0.1 | 0.3 | 0.1 |
| JOA | 0.6 | 0.2 | ... | 0.2 | 0.1 | 0.4 |
| OAN | 0.1 | 0.1 | ... | 0.0 | 0.0 | 0.3 |
| ANN | 0.9 | 0.3 | ... | 0.5 | 0.0 | 0.5 |
| NNA | 1.0 | 0.6 | ... | 0.4 | 0.0 | 0.3 |
| NA$ | 0.9 | 0.4 | ... | 0.4 | 0.0 | 0.3 |

FIG. 12

NEOLOGISM CLASSIFICATION TECHNIQUES WITH TRIGRAMS AND LONGEST COMMON SUBSEQUENCES

CROSS-REFERENCES TO RELATED APPLICATIONS

The present application claims priority under 35 U.S.C. § 119(e) to U.S. Provisional Patent Application No. 62/888,998, filed Aug. 19, 2019, entitled "NEOLOGISM CLASSIFICATION TECHNIQUES," the entire contents of which is incorporated herein by reference for all purposes.

BACKGROUND

The present disclosure relates generally to data analysis and processing. More particularly, techniques are disclosed for analysis and processing of neologisms.

Big data users may have large quantities of data (e.g., datasets) about their customers. Users can include users of the datasets, such as companies. Datasets can be in the form of spreadsheets and tables and can include information regarding customers, such as, customer ID, first name, last name, address, etc. Users may have datasets from different sources. The datasets can include names, demographics and geographic information, etc.

The datasets can be more useful to users if additional information can be determined from the datasets. For example, it may be beneficial to know additional information regarding a customer, such as gender, generation and other demographic information if such information is not readily available.

Datasets may include words that have never been seen before (e.g., neologism). For example, a customer's name may be a unique name or a unique spelling of a name. Further, the name of a company where a customer works may be an unknown name or a made up word. It is difficult to determine additional information for never-before-seen words since there is no existing information (e.g., attributes, characteristics, etc.) about such words to obtain information from.

Techniques exist for determining similarity between words. For example, given an unknown word, one could find the most similar word contained within a corpus of words. However, such techniques do not provide accurate results. For example, using the most similar word contained within a training corpus of words does not provide accurate results and the inferred attributes for an unknown word are not accurate. Specifically, using whole words does not provide highly accurate results.

Therefore, a more accurate method of identifying characteristics for an unknown word is needed. Example embodiments address these and other problems.

Other embodiments are directed to systems, devices, and computer readable media associated with the methods described herein. A better understanding of the nature and advantages of exemplary embodiments may be gained with reference to the following detailed description and the accompanying drawings.

BRIEF SUMMARY

An example embodiment is configured to make a prediction about real-world characteristics of a never-before-seen word or name (e.g., neologism).

Given a body of text (e.g., dataset, spreadsheet, etc.), there may be words that have never been seen before. For example, new names or differently spelled names may be included in the dataset. As another example, new words may be created or new variations of words may be created. A never-before-seen word or name is a word or name for which the meaning and/or characteristics associated with the word or name are currently unknown. A never-before-seen word or name can be known as a neologism. An unknown word or name will be referred to as an unknown word in the description.

An example embodiment enriches datasets so that the dataset information can be more useful. For example, a user may have large datasets (e.g., big data). The datasets can be made more useful if additional information and characteristics can be determined based on the datasets. An example embodiment can determine meaning from an unknown word, thereby making the dataset more useful. The datasets can be in the form of spreadsheets which includes columns and rows of data. The datasets can include a column of data that includes one or more neologisms. For example, a column of a dataset directed to first names can include some names that have never been seen before.

An example embodiment can decipher additional information based on the unknown word. For example, an example embodiment can determine characteristics such as, industry, language, gender, generation, etc. based on an unknown name. Industry, language, gender, and generation are described as examples, however, other characteristics and attributes can be determined for a dataset depending on the type (e.g., first names, company names, etc.) of data in the dataset.

Further, an example embodiment can determine characteristics and additional information associated with an unknown word at a high rate of accuracy. Therefore, a user does not have to guess regarding classifications.

A particular name or word may have known characteristics. For example, a name such as "Alice" can be associated as being a female name. Specifically, given historical information and prior word analysis, a name such as "Alice" has been associated with females. However, a person may spell their name as "Allys." This may be the first instance of such a name or there may not be any associations with the name. Therefore, the name "Allys" may not be associated with particular characteristics. In addition to names, there may be words that have never been seen before. New words or new spellings of words may be created and therefore, have no historical context or associations.

An example embodiment can predict which language a word or name comes from, predict an industry based on a name (e.g. company name), and predict gender based on a person's name. Predicting gender may be useful for aggregates in market segmentation analysis.

An example embodiment can infer meaning based on the spelling of the unknown word. Meaning can be inferred using trigrams and trigrams can be used to provide information about an unknown word. Specifically, the meaning of an unknown word can be determined by treating three-letter trigrams as a language in itself. That is, meaning can be inferred based on the order of trigrams within a word, similar to the way order of words within a sentence convey meaning. For example, based on trigrams and historical data, it can be determined that names that end with a vowel are often associated with a female.

An example embodiment runs trigrams extracted from words of a training set through a neural network (e.g., Word2Vec). Further, supervised learning can be performed in order to make predictions about attributes and characteristics of the unknown word. As indicated above, attributes and characteristics of the unknown word, that is, the labels for supervised learning, can include language a word comes from, industry, gender, generation, etc. Attributes and characteristics of the unknown word include additional information that can be determined for an unknown word. Therefore, a user does not merely have a dataset of, for example, first names, but the user then has additional information (e.g., labels for these data items), such as gender of their customers, industries that their customers work in, etc. The dataset is thereby made more useful to a user.

BRIEF DESCRIPTION OF THE DRAWINGS

The disclosure will be readily understood by the following detailed description in conjunction with the accompanying drawings, wherein like reference numerals designate like elements, and in which:

FIG. 4 is an overview of variables for classifying a neologism, in accordance with some example embodiments.

FIG. 5 illustrates determining trigrams for an input word, in accordance with some example embodiments.

FIG. 6 illustrates a matrix with trigram word embedding model vectors, in accordance with some example embodiments.

FIG. 8 illustrates determining nearest names for an input word, in accordance with some example embodiments.

FIG. 12 illustrates the matrix including classification values, in accordance with some example embodiments.

DETAILED DESCRIPTION

Figure 1:
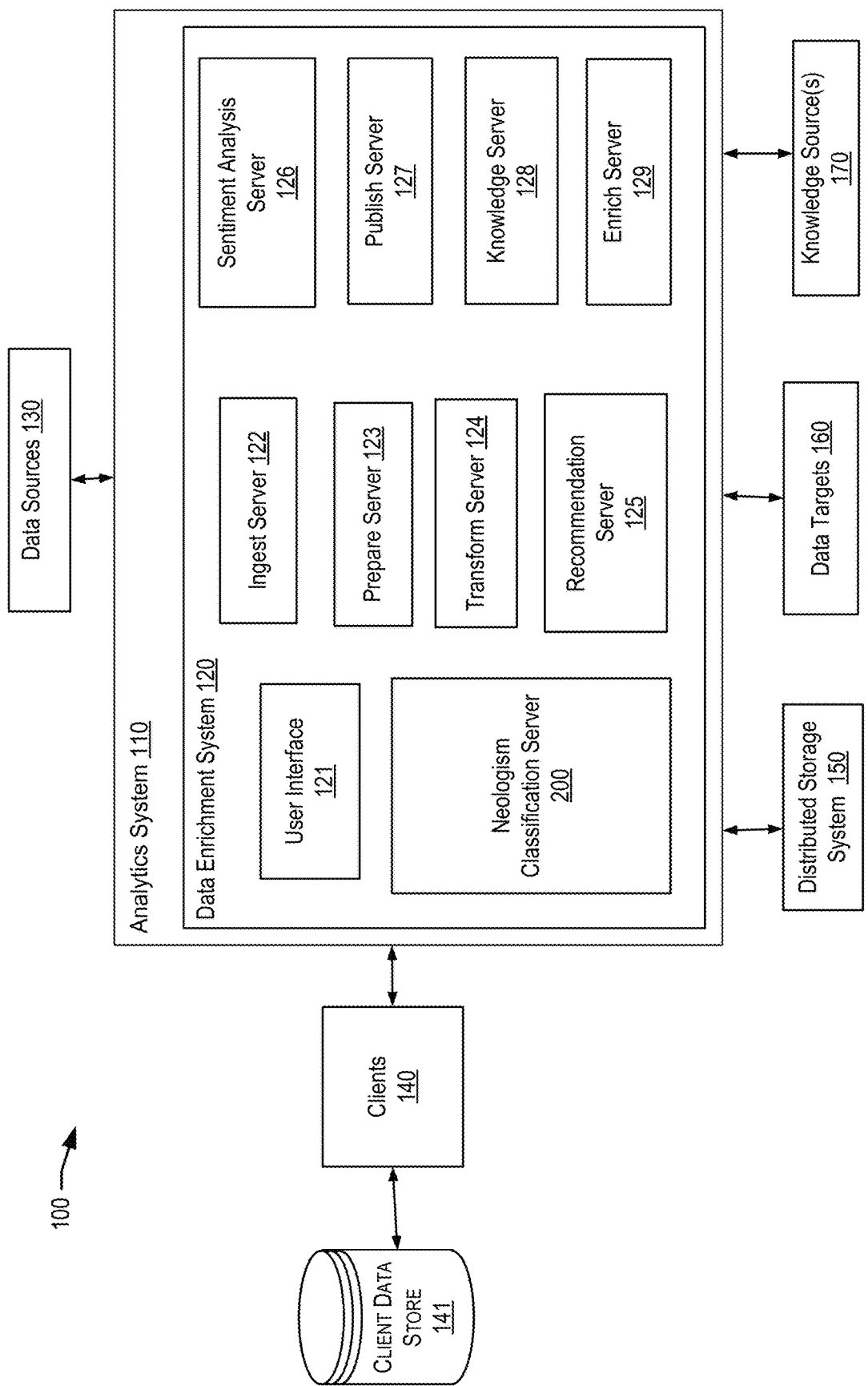
FIG. 1 illustrates a block diagram of an analytics environment, in accordance with some example embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

A neologism can be a new word or phrase. A neologism can be a newly coined word or a word that is not commonly used. Neologisms can be driven by changes in culture and technology. Further, neologisms can be driven by social media and popular culture. New words and names and spellings of words and names are continuously being created. An example embodiment can determine attributes or characteristics that can be associated with a neologism.

In the description, a user is a user of the data, such as a company. However, a user can include any person or entity for which neologism classification would be beneficial. The data can be more meaningful to the user if the data includes additional information. By enriching the data, the data becomes more useful to the user. The data can include, for example, customer data (e.g., first name, last name, ID, social security number, etc.) and purchase data (e.g., store name, items purchased, etc.).

Example embodiments can be used in various situations. For example, there may be a given word in which it is unclear as to which language the word belongs. As another example, given a word such as a name of a company, an industry associated with the company be identified. As another example, example embodiments can be used to predict gender given, for example, a first name. Example embodiments can be used to predict the age or the generation of a customer based on their first name. These are merely example situations in which additional characteristics can be identified and data is therefore made more beneficial to a user.

Example embodiments can be useful in for example market segmentation. Market segmentation can include dividing a broad consumer or business market, such as customers, into sub-groups of consumers based on some type of shared characteristics.

An example embodiment provides a solution for classifying words. For example, a reference list may have a list of first names and the gender typically represented by the first name. For example, the name "David" can be associated with the gender "male." The associated gender can be based on the frequency of association based on historical data.

However, new names and new spellings of names may be created. An example embodiment can provide the gender for a name that has not been previously seen before. That is, for a name that has not been identified in a dictionary of names or words. For example, the name "Chauna" may not be in a dictionary of names. Therefore, it is unclear if the name is associated with a male or female. In order to determine the gender for the name "Chauna," binary classification can be performed. That is, two classification groups can be identified. For use cases where making predictions on individuals may carry ethical concerns, this technique may be useful in use cases where populations are aggregated, such as for market segmentation identification. However, this is an example embodiment and additional changes can be made based on desired classifications. Example embodiments are not limited to two classifications. Additional classifications can be made based on the needs of the user.

I. Analytics Environment

FIG. 1 illustrates a block diagram of an analytics environment 100, in accordance with some example embodiments.

The data analytics environment 100 can include analytics system 110, data enrichment system 120, data sources 130, clients 140, client data store 141, distributed storage system 150, data targets 160, and knowledge sources 170. The data enrichment system 120 can include a user interface 121, an ingest server 122, a prepare server 123, a transform server 124, a recommendation server 125, a sentiment analysis server 126, a publish server 127, a knowledge, server 128, an enrich server 129 and neologism classification server 200. The neologism classification server 200 is explained in greater detail with respect to FIG. 2.

The analytics environment 100 can be a cloud-based environment. The analytics system 110 provides a single unified platform, including self-service visualization, powerful inline data preparation, enterprise reporting, advanced analytics, and self-learning analytics that deliver proactive insights. The analytics system 110 can include, for example, Oracle Analytics Cloud.

A client or user 140 can submit a data enrichment request to the data enrichment system 120 of the analytics system 110. The client can include a client data store 141 to store data associated with the client. The data enrichment system 120 can identify one or more of the data sources 130 (or portions thereof, e.g., particular tables, datasets, etc.). The data enrichment system 120 may then request data to be processed from the identified data sources 130.

In some embodiments, the data sources may be sampled, and the sampled data analyzed for enrichment, making large datasets more manageable. The identified data can be received and added to a distributed storage system (such as a Hadoop Distributed Storage (HDFS) system) accessible to the data enrichment service. The data may be processed semantically by a number of processing stages (described herein as a pipeline or semantic pipeline). These processing stages can include preparation stages via preparation server 123, publishing stages via publish server 127, an enrich stage via the enrich server 129.

In some embodiments, a prepare stage can include various processing sub-stages. This may include automatically detecting a data source format and performing content extraction and/or repair. Once the data source format is identified, the data source can be automatically normalized into a format that can be processed by the data enrichment service. In some embodiments, once a data source has been prepared, it can be processed by the enrich server 129. In some embodiments, inbound data sources can be loaded into a distributed storage system 150 accessible to the data enrichment system 120 (such as an HDFS system communicatively coupled to the data enrichment service).

The distributed storage system 150 provides a temporary storage space for ingested data files, and can also provide storage of intermediate processing files, and for temporary storage of results prior to publication. In some embodiments, enhanced or enriched results can also be stored in the distributed storage system. In some embodiments, metadata captured during enrichment associated with the ingested data source can be stored in the distributed storage system 150. System level metadata (e.g., that indicates the location of data sources, results, processing history, user sessions, execution history, and configurations, etc.) can be stored in the distributed storage system or in a separate repository accessible to the data enrichment service.

In some embodiments, data enrichment system 120 may provide sentiment analysis through a sentiment analysis server 126. The sentiment analysis server 126 includes functionality for analyzing sentiment of data from different data sources using techniques disclosed herein. Techniques include the application of convolutional neural networks (CNNs), a lexical co-occurrence network, and bigram word vectors to perform sentiment analysis to improve accuracy of analysis.

In some embodiments, a publish stage via a publish server 127 can provide data source metadata captured during enrichment and any data source enrichments or repairs to one or more visualization systems for analysis (e.g., display recommended data transformations, enrichments, and/or other modifications to a user). The publishing sub-system can deliver the processed data to one or more data targets. A data target may correspond to a place where the processed data can be sent. The place may be, for example, a location in memory, a computing system, a database, or a system that provides a service. For example, a data target may include Oracle Storage Cloud Service (OSCS), URLs, third party storage services, web services, and other cloud services such as Oracle Business Intelligence (BI), Database as a Service, and Database Schema as a Service. In some embodiments, a syndication engine provides customers with a set of APIs to browse, select, and subscribe to results. Once subscribed and when new results are produced, the results data can be provided as a direct feed either to external web service endpoints or as bulk file downloads.

As described further below, the data can be enriched to include additional related information for unknown words or neologisms. A neologism classification server 200 can analyze neologisms and determine attributes or characteristics for neologisms. Data can be obtained from data sources 130 and the neologism classification server 200 can determine attributes and/or characteristics for the neologisms. Attributes can include qualities or features that are characteristic or inherent to people or things having certain words or names.

An example embodiment provides a data enrichment system using machine learning so that a user does not have to analyze all the data themselves. Further, the data enrichment system can perform determinations without user intervention. Therefore, the data enrichment system can perform the analysis for users.

Through this disclosure, various flowcharts and techniques are disclosed illustrating processes according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in the figures may be implemented in software (e.g., code, instructions, program) executed by one or more processing units (e.g., processors cores), hardware, or combinations thereof. For example, data enrichment system 120 can be implemented by a computer system for the processes described with reference to any of the figures. Any of the processes may be implemented as a service. In some embodiments, any of the elements in the figures may be implemented with more or fewer subsystems and/or modules than shown in the figure, may combine two or more subsystems and/or modules, or may have a different configuration or arrangement of subsystems and/or modules. Subsystems and modules may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

The particular series of processing steps in the figures is not intended to be limiting. Other sequences of steps may also be performed according to alternative embodiments. For example, alternative embodiments may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, data may be stored using one or more data structures. Data structures may be organized in a variety of ways depending on how, what, and/or where data is stored. Although each of the data structures are shown including particular data, more or fewer data structures may be implemented to store the data. A data structure can include a reference to other data structures. The data structures may be implemented using one or more types of data structures including, without restriction, a linked list, an array, a hashtable, a map, a record, a graph, or other type of data structure. A data structure may be implemented in a hierarchical manner. Each of the data structures may be defined in a declarative manner based on input by a user. The data structures can be defined based on a template, e.g., a template defined based on a markup language, such as Extended Markup Language (XML). A data structure may have one or more formats, also referred to as a document format.

II. Neologism Classification Server

Figure 2:
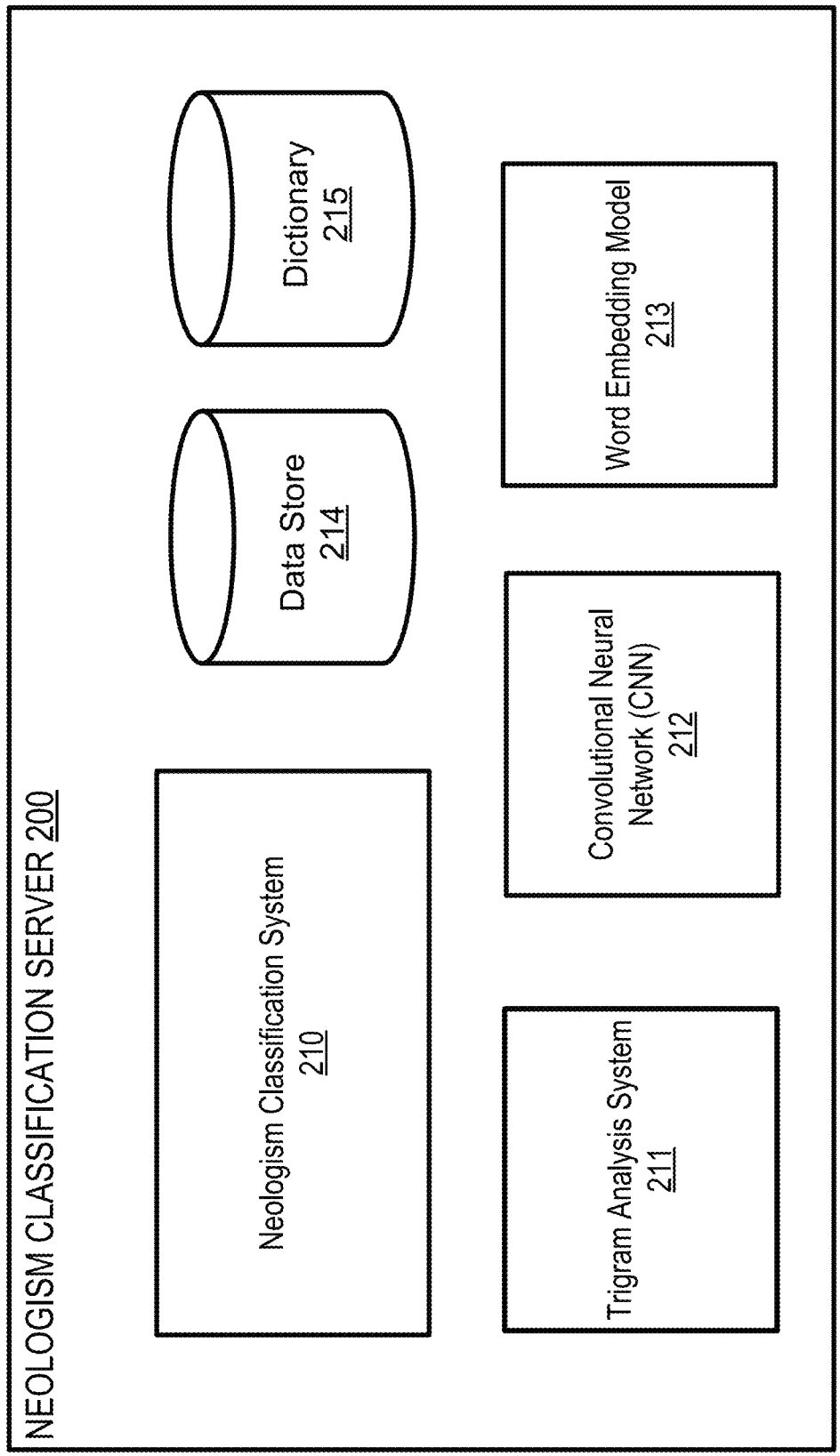
FIG. 2 illustrates a block diagram of a neologism classification server of the data enrichment system, in accordance with some example embodiments.

FIG. 2 illustrates a block diagram of a neologism classification server 200 of the data enrichment system 120, in accordance with some example embodiments.

The neologism classification server 200 can include a neologism classification system 210, trigram analysis system 211, convolutional neural network (CNN) 212, word embedding model 213, data store 214 and dictionary 215.

Neologism classification system 210 can perform enrichment for unknown words or neologisms. The neologism classification system 210 can provide a classification for a neologism based on the information received from trigram analysis system 211, convolutional neural network (CNN) 212, word embedding model 213, data store 214 and dictionary 215.

The trigram analysis system 211 can perform analysis on neologisms using trigrams. A trigram is group of three consecutive written units such as letters, syllables, or words. In the example embodiment, a trigram is three consecutive letters. The trigram analysis system generates trigrams for a given word. The generated trigrams include letters that overlap. For example, two letters of each trigram can overlap. Each trigram that is generated for a given word starts one letter to the right of the previous trigram. For example, for the name "BOB", trigrams would include "^BO," "BOB," and "OB$." The trigram analysis is explained in greater detail with respect to FIG. 5.

Convolutional neural network (CNN) 212 is a class of deep neural networks. A CNN adds weighting to values. A CNN can be trained to analyze, for example, a set of names in a matter of minutes. A convolutional neural network is explained in greater detail with respect to FIG. 13.

Word embedding model 213 is a model that can be used to produce word embedding vectors. Word embedding can include a natural language processing (NLP) where words or phrases from the vocabulary are mapped to vectors of real numbers. An example word embedding model that can be used in an example embodiment is Word2Vec. Word2Vec may be implemented using techniques disclosed in "Exploiting Similarities among Languages for Machine Translation" (2013), by Mikolov et al., which is incorporated herein by reference for all purposes.

A word embedding model can include an algorithm which is fed a corpus of vocabulary. A large body of text (e.g., from articles, newspapers) is obtained and fed to an algorithm of the word embedding model. The word embedding model vectors includes weight variables (e.g., 300 aspects to a trigram). The weight variables add dimension to the trigrams being analyzed.

In the case of names, the corpus words can include names from the census bureau. The word embedding model can be trained using trigrams of names from the census bureau. A word embedding model is explained in greater detail with respect to FIG. 7.

Data store 214 can be used to store data from the dataset for which neologism classification is to be performed. For example, a client can provide a spreadsheet of data that includes columns and rows of data. The data to be analyzed by the neologism classification server 200 can be stored in the data store 214. The data store 214 can also store counter values and a matrix including word embedding model vector values and classification values.

Dictionary 215 can include a deep learning library (e.g. DeepLearning for JVM, Tiny Neural Network (TINN), etc.). A deep learning library can provide a library of functions and modules that can be used to generate the code for the neologism classification server 200. A deep learning library can help promote machine learning for the neologism classification server 200.

III. Overview of Method for Performing Neologism Classification

An example embodiment is directed to neologism classification. Classification can be performed using logistic regression. Logistic regression can include using a statistical model that uses a logistic function to model variables. In the example described, binary classification (e.g., two classifications) is used however, example embodiments are not limited to binary classification. For example, generation identification can include more than two classifications (e.g., Silent, Boomer, X, Millennial, Z, etc.) Classifications can be based on a number of possible attributes or characteristics. A number of classifications can be based on parameters input by a user.

Figure 3:
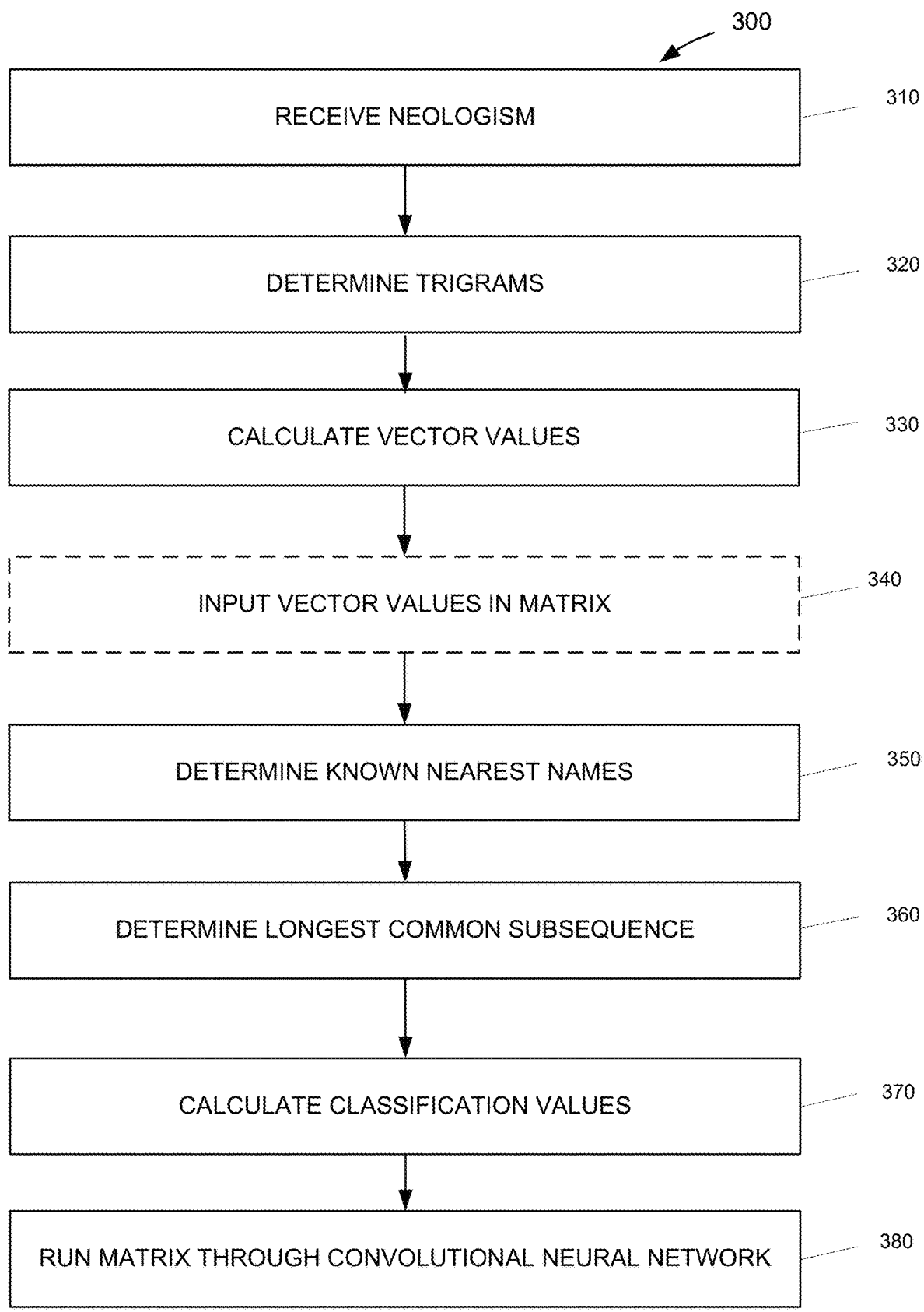
FIG. 3 illustrates a flowchart of a method for classifying a neologism, in accordance with some example embodiments.

FIG. 3 illustrates a flowchart of a method 300 for classifying a neologism, in accordance with some example embodiments. FIG. 3 is described with respect to the variables shown in FIG. 4.

FIG. 4 is an overview of variables 400 for classifying a neologism, in accordance with some example embodiments. The variables shown in FIG. 4 can be input variables or input values. The variable "w" represents an input word which is a neologism or unknown word or name, the variable "M" represents a matrix to be populated with word embedding model vectors and classification values, the variable "k" represents an input value of a number of known nearest neighbors, the variable "S" represents a set including the known nearest names and the number of names in the set S will correspond to the number in the input value k, the variable "w q" represents identified trigrams for the input word "w" and the variable "Q" represents a list of N queues, where each queue is initialized according to a longest common subsequences (LCS) between the input word w and the set S of known nearest neighbors. The N in the list of N queues represents a number of queues. Each queue can be initialized according to the equation LCS (w, S[i]). The value of N in FIG. 4 is 3 since there are three nearest neighbors. The variables and their values are explained in greater detail below.

At step 310, an initial input is received. The initial input can be known as a neologism or as an unknown word or name. The neologism is represented by the variable "w". The initial input can be selected by the user so as to train the neologism classification server to classify attributes of the neologism. For purposes of example, one input word is received. However, in an example embodiment, a plurality of inputs can be received such as a plurality of words in a column of data (e.g., column of data in a spreadsheet).

The initial input can be received on a user interface of the data enrichment system. The unknown word can be manually input by a user. For example, the neologism can be input via a user interface of the data enrichment system. Alternatively, the unknown word can be input automatically by the neologism classification server. The neologism classification server can obtain one or more unknown words generated by the data enrichment system or can obtain the one or more unknown words from data sources.

In the example shown in FIG. 4, the input word w is "JOANNA." However, this is merely for purposes of explanation and any name or word can be used for analysis. For purposes of example and ease of explanation, a known name is used to demonstrate how classification is performed. Example embodiments can also be used to identify attributes for known names.

Example embodiments can provide high accuracy classification results for neologisms or unknown words or names. Example embodiments are beneficial is assisting a user with determining attributes for a name that has never been seen before or does not exist is a library of names. The library of names and words can be stored in data store 214. Although a name is described, example embodiments apply to any word and is not limited to names. Further, a single word is described, however example embodiments can be applied to a group of words, an expression or a phrase.

At step 320, trigrams are determined for the input word. The identified trigrams can be represented by the variable "wq." Trigrams are identified with the letters being in order since the order of the letters carries meaning; and the order of the trigrams carries additional meaning. Therefore, the trigrams are for three (3) letters that are in order based on the input word. The trigrams can be determined by the trigram analysis system 211.

FIG. 5 illustrates trigrams 500 for an input word, in accordance with some example embodiments. As shown in FIG. 5, six trigrams are identified for the word that was input at step 310. Trigrams are a group of three consecutive written units such as letters, syllables, symbols or words. In the example shown in FIG. 4, the trigrams are groups of letters and symbols. The six trigrams that are identified for the input word "JOANNA" include "^JO, JOA, OAN, ANN, NNA, NA$." The trigrams that are identified are found in consecutive order in the word "JOANNA." The symbols "^" represent a beginning of a string and the character "$" represents the end of a string. That is, in the "beginning of string" and "end of string" ghost characters (e.g., ^ and $) participate in the breakdown of the word into trigrams. In generating the trigrams, two letters overlap from a previous trigram.

At step 330, word embedded vector values are calculated for the trigrams. For each of the trigrams wq, word embedding vector values are trained Word embedding vector values can be calculated using word embedding models, such as, Word2Vec. The word embedding model is trained specifically for the type of word that is being analyzed. Therefore, in the example described, the word embedding model is trained specifically for first names and more specifically, for trigrams of first names.

The word embedding model is trained to analyze trigrams of words instead of whole words. Therefore, the word embedding model according to an example embodiment is trained for trigrams. The training is performed for trigrams since trigrams form a language. Trigrams within a word form a language in a manner similar to how words within a sentence form a language. The positions and order of letters and trigrams within a string of characters can affect the classification of the input word. For example, based on trigram analysis, it can be determined that female names more typically end in a vowel than male names.

In the example described, the word type is first names. Other types or categories of words can include last names or business names, etc. However, these are merely examples and different types of names or words can be used. The word embedding model is trained specifically for the type of word that is being analyzed and does not use a general word embedding model that is trained for general words. Specifically, using a general word embedding model will not produce as accurate a result as using a word embedding model that is trained specifically for the type of word that is being analyzed.

At step 340, the vector values that were calculated are input into the matrix M. That is, the matrix M is populated to include the vector values associated with the trigrams wq. Although population of the matrix M with vector values is performed at step 340, the population of the vector values in the matrix M can be performed at a later time prior to running the matrix through a convolutional neural network.

FIG. 6 illustrates a matrix M 600 with trigram word embedding model vectors, in accordance with some example embodiments.

As shown in FIG. 6, the matrix M 600 includes trigrams 610 that were generated at step 320. Therefore, the matrix M 600 includes six rows for the six trigrams that were identified for the input word "JOANNA." The number of rows for the matrix M 600 will vary based on the number of trigrams that are determined for the neologism. The matrix M 600 includes word embedding model vector columns 620. In the example shown, 300 columns of word embedding model vectors are used. The matrix M is populated with trigram word embedding model vectors 620. Therefore, the word embedding model has a dimensionality of 300. 300 is a number for the word embedding model that is not underfitting or overfitting. 300 is used in an example, but more or less vectors can be used based on the needs of the user.

The matrix M 600 also includes classification columns 630. In the example, two classifications are to be determined (e.g., male and female). The number of classifications columns will depend on the number of possible classifications or the number of classifications desired by a user. For example, with generation identification there may be five classification columns corresponding to five different possible generation classifications (e.g., silent, boomer, X, millennial, Z, etc.). The types of classifications can vary based on the data being analyzed or based on the classification information desired by a user. Classifications can also be known as labels.

As shown in FIG. 6, there is a first column 631 for the first classification column (e.g., male) and a second column 632 for the second classification (e.g., female). Two classifications are shown in FIG. 6, however, example embodiments are not limited to two classifications. Therefore, the number of classification columns can vary based on the classifications that the user would like to determine. An example embodiment provides techniques for filling in the classification columns of the matrix M.

The matrix M is created where the rows are word embedding model vectors, laid one after the other in the order they appear, making the vertical axis of the matrix a form of a time dimension. The "words" modeled in the word embedding model are trigrams (of three letters) rather than words, as is done in a sentiment analysis technique. A sentiment analysis technique can include training a CNN with one layer of convolution on top of word vectors obtained from an unsupervised neural language model. A convolutional neural network can be built on top of a word embedding model (e.g., Word2Vec). A word embedding model is trained using the input training data (e.g. a dictionary of first names). Sentiment analysis may be implemented using techniques disclosed in "Convolutional Neural Networks for Sentence Classification" (2014), by Kim, which is incorporated herein by reference for all purposes.

A process for calculating word embedding model vectors 620 are explained in greater detail below with respect to FIG. 7.

At step 350 k nearest names or k nearest neighbors are determined for the input word. k nearest neighbors or names can be identified using similarity metrics. Similarity metrics can include semantic similarity metrics, such as Jaccard or Dice. The k nearest names are names which have trigrams that are similar to the input word. That is, the k nearest names are first names which have trigrams that are similar to the input name "JOANNA."

In order to identify k nearest neighbors, fuzzy string matching can be performed. Given a never-seen-before string, the similarity metric can find the closest matches from a dictionary, and then in the manner of k nearest neighbors, make a prediction for the classification of the never-seen-before string based upon the classifications of the k-nearest neighbors. The word for which the classification is being predicted (e.g. a first name never seen before) is run through, for example, StatSim k nearest neighbors and the top K (e.g., 3) matches are used. The top K matches are in a set S.

k nearest names can be identified. The input parameter k represents a number of nearest names. The determined k nearest names are identified in the set S. For purposes of brevity of explanation, 3 nearest names are identified. Therefore, the value of k is 3. However, the value of k can be changed based on the results desired by the user. For example, in alternative embodiments, the value of k can be 10.

Element 640 of FIG. 6 shows that the number of k nearest names, which identified by the variable k, is 3. Therefore, 3 nearest names have been identified for the input word.

FIG. 8 illustrates a set of nearest names S 800 for the input word, in accordance with some example embodiments. The set S of nearest neighbors for the input word "JOANNA" includes the three nearest names of "JOANNE," JOHN," and "ANNA."

At step 360 longest common subsequences are determined. Specifically, the longest common subsequences with respect to trigrams from the input word and trigrams from the k nearest neighbors ("JOANNE," JOHN," and "ANNA") are identified.

Figure 9:
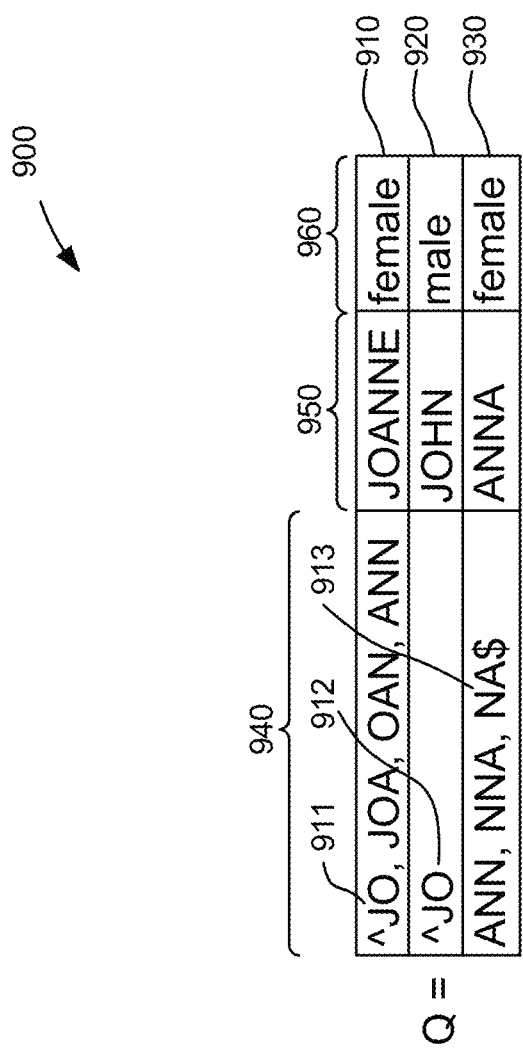
FIG. 9 illustrates a table representing a list of queues, in accordance with some example embodiments.

FIG. 9 illustrates a table Q 900 representing a list of N queues, in accordance with some example embodiments. Each queue is initialized according to a longest common subsequence (LCS) between the input word w and the set of k nearest neighbors. Each queue can be initialized according to the equation LCS (w, S[i]). From the k nearest names that were identified in step 350, the longest common subsequences are identified.

The table Q 900 includes a column 940 representing trigrams of the k nearest neighbors that are common to the trigrams wq of the input word, a column 950 including the k nearest neighbors, and a column 960 identifying a classification (e.g., gender) for the respective k nearest neighbors in column 950. In the example shown, there are three rows for each of the k nearest neighbors, since there are three nearest neighbors (k=3). However, this is merely for purposes of explanation, and the k nearest neighbors is not limited to three. For example, ten nearest neighbors may be used. The table Q 900 would be larger depending on the number of k nearest neighbors.

Row 910 corresponds to the name "JOANNE," row 920 corresponds to the name "JOHN" and row 930 corresponds to the name "ANNA" of the k nearest neighbors. Row 910 corresponds to the input word "JOANNE." Row 910, corresponding to "JOANNE," includes trigrams 911 (e.g, ˆJO, JOA, OAN, ANN). Row 920, corresponding to the name "JOHN," includes trigram 912 (e.g, ˆJO). Row 930, corresponding to the name "ANNA," includes trigrams 913 (e.g, ANN, NNA, NA$).

The trigrams 911, 912 and 913 match trigrams in trigrams wq for the input word w "JOANNA." Trigrams for the k nearest neighbors (JOANNE, ANNA, JOHN) that do not match the trigrams wq for the input word w "JOANNA" are not included in the table Q 900. For example, the name "JOHN" includes the trigram "OHN." Since the trigram "OHN" does not match a trigram in trigrams wq for the input word w "JOANNA," the trigram "OHN" is not included in the trigrams 912 for the one of the k nearest neighbors "JOHN." Therefore, the trigrams that are common to the k nearest neighbors and the input name are put in the table Q 900.

The trigrams that are common to the k nearest neighbors and the input name are determined using longest common subsequence (LCS). Given two input strings (e.g, input name and one of the nearest neighbors), an LCS algorithm can be used to find the longest common subsequence between the two lists of trigrams. An LCS algorithm may be implemented using techniques disclosed in "The String-to-String Correction Problem" (1974), Wagner, which is incorporated herein by reference for all purposes.

At step 370 classification values are calculated. The calculation of the classification values are explained in greater detail with respect to FIGS. 10 and 11.

FIG. 12 illustrates the matrix M 1200 including classification values for a first classification 1231 and a second classification 1232, in accordance with some example embodiments. FIG. 12 illustrates the matrix M after the classification values have been determined and populated in the matrix M.

As shown in FIG. 12, the matrix M includes 6 rows 1210 for each of the trigrams wq that were identified for the input word w. Each row in the matrix represents a trigram and each trigram matches a corresponding trigram in one or more of the N StatSim matching words from the dictionary. The matrix M includes word embedding vector values 1220 for 300 columns of vectors.

The matrix M includes classification columns 1230. The classification columns include a first classification column 1231 and a second classification column 1232. Two classification columns are described, however, the number of classifications or labels can vary based on the types of classifications identified by the user. The number of classifications can vary depending on, for example, the type of marketing the user would like to perform or the audiences the user would like to target or the business strategies of the user.

The classification values represent how many other similar names contain that particular trigram. The other similar names are obtained from a dictionary of known names. In the example described, since a name is being analyzed, the dictionary is of known names. However, if different types of input words are being analyzed (e.g., company names) then a dictionary of such names will be used for trigram comparison.

As shown in FIG. 12, the first classification column 1131 includes the values "0.3, 0.1, 0.0, 0.0, 0.0, 0.0" for the trigrams "^JO, JOA, OAN, ANN, NNA, NA$" respectively. The second classification column 1232 includes the values "0.1, 0.4, 0.3, 0.5, 0.3, 0.3" for the trigrams "^JO, JOA, OAN, ANN, NNA, NA$" respectively.

Based on the classification results, the second classification column 1132 results in higher values than the first classification column 1131. Therefore, the input word "JOANNA" more likely falls under the second classification (e.g., female). However, increased accuracy of results is obtained because the matrix is run through a convolutional neural network (CNN).

At step 380 the matrix M is run through a convolutional neural network. After the matrix M has been populated with the word embedding model vector values and the classification values, the matrix will run through a convolutional neural network. The convolutional neural network can identify whether the input word more likely belongs to a first classification or a second classification.

A CNN in an example embodiment analyzes a matrix including vectors from a word embedding model as well as classification values that were obtained using trigram analysis. Rectified Linear Unit (ReLU) weight initialization can be used for the CNN because the activation between the Global Max-Pooling Layer and the Dense Layer in the CNN is ReLU. A convolutional neural network is explained in greater detail below with respect to FIG. 13.

IV. Word Embedding Model

Figure 7:
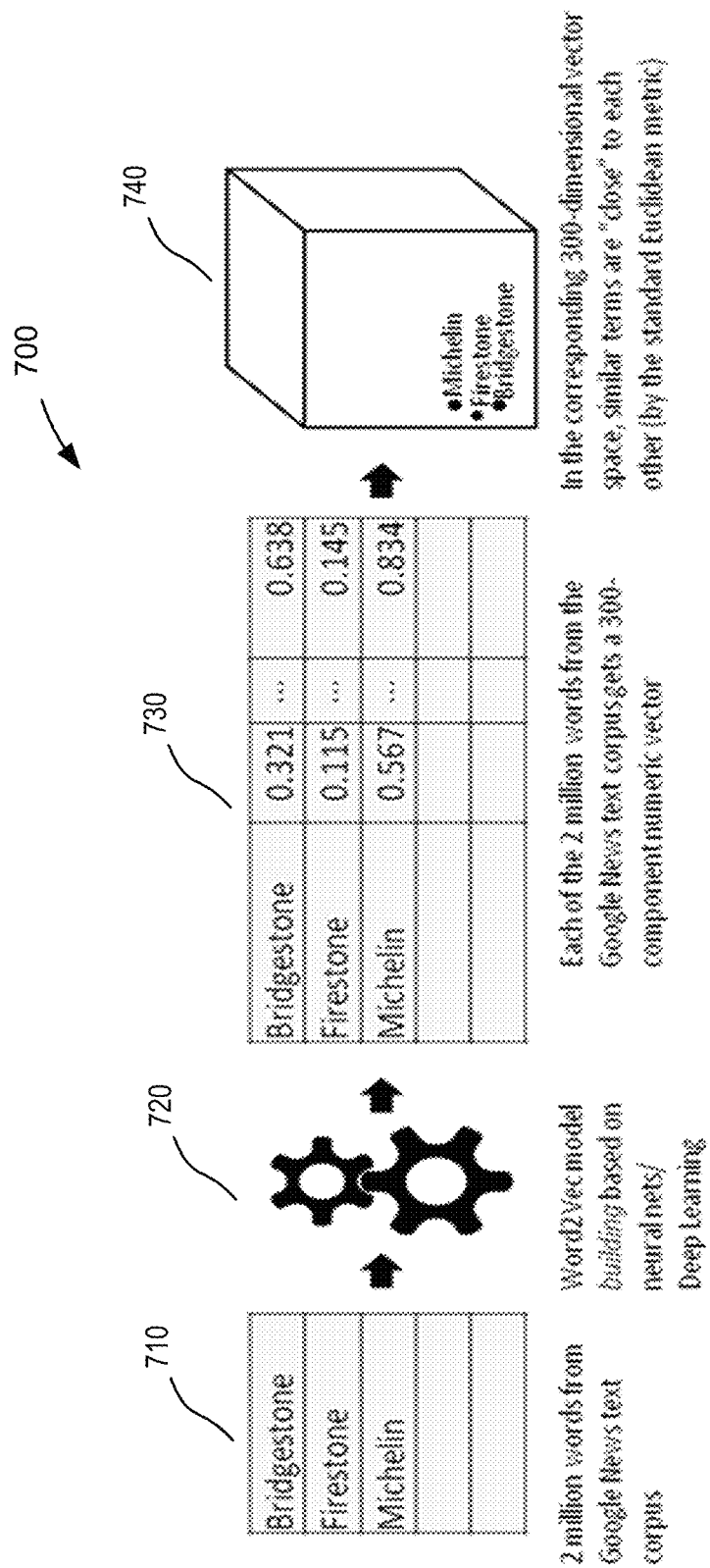
FIG. 7 illustrate a process for calculating vectors for words, in accordance with some example embodiments.

FIG. 7 illustrate a general process 700 for calculating vectors for words, in accordance with some example embodiments. However, an example embodiment will calculate vectors for trigrams.

At step 710, words are input. In the example shown in FIG. 7, an input set of words can include "Bridgestone", "Firestone", and "Michelin." However, in an example embodiment, the input set of words can include the trigrams that were identified for a neologism.

At step 720, the input dataset is analyzed. The data can be analyzed by using a machine learning technique, such as Word2Vec, to analyze an input dataset. Word2Vec is incorporated by reference for all purposes. Word2Vec may be implemented using techniques disclosed in "Exploiting Similarities among Languages for Machine Translation" (2013), by Mikolov et al., which is incorporated herein by reference for all purposes. Word2Vec can receive a text input (e.g., a text corpus from a large data source) and generate a data structure (e.g., a vector representation) of each input word as a set of words. The data structure may be referred to herein at a "model" or "Word2Vec model." Although Word2Vec is described, other word embedding models can be used to perform the data analysis.

At step 730, each word in the set of words is associated with a plurality of attributes. The attributes can also be called features, vectors, components, and feature vectors. For example, the data structure may include 300 features associated with each word in the set of words. Features can include, for example, gender, nationality, etc. which describe the words. Each of the features may be determined based on techniques for machine learning (e.g., supervised machine learning) trained based on association with sentiment.

Using the Word2Vec model built using a large text corpus (e.g., a news aggregator, or other data source, such as Google news corpus), a corresponding numeric vector value (e.g., floating point) can be identified for each input word. When these vectors are analyzed, it may be determined that the vectors are "close" (in the Euclidean sense) within a vector space. As shown in step 740, the three input words are clustered closely together within the vector space.

In some embodiments, a Word2Vec model may be generated by a third party provider. The Word2Vec model may be obtained via an application programming interface (API) of the provider. The API may provide functions for obtaining the Word2Vec model including information about the word embedding model, such as the number of components for each word in the model.

Step 730 may include generating a data structure (e.g., vector data structure) as a two-dimensional matrix based on the training data. Each axis (x-axis and y-axis) in the matrix has coordinates or dimensions. For the training data, one or more applications (e.g., a Lambda application) may be utilized to compute the height of the vector based on the length of a longest text string. For example, the data structure is generated for each message, wherein the height is the maximum number of words in a single review. In constructing the two-dimensional matrix, each row is defined as a word vector and each column can be defined as a feature vector. The data structure is created as input to an API for implementing a convolutional neural network (CNN). The two-dimensional matrix is created such that the y-axis has an entry for each word in a single message, and the x-axis is for the baseline sentiment analysis approach. Each entry or dimension on the x-axis corresponds to a feature of the features in the Word2Vec model. Multiple features can be listed for the word on the x-axis. Each of the features for each word may be obtained from the Word2Vec model generated based on training data.

The word embedding model vector columns 620 of FIG. 6 illustrate a generated data structure (e.g., vector data structure).

V. Calculating Classification Values

A. Overview of Method of Calculating Classification Values

Figure 10:
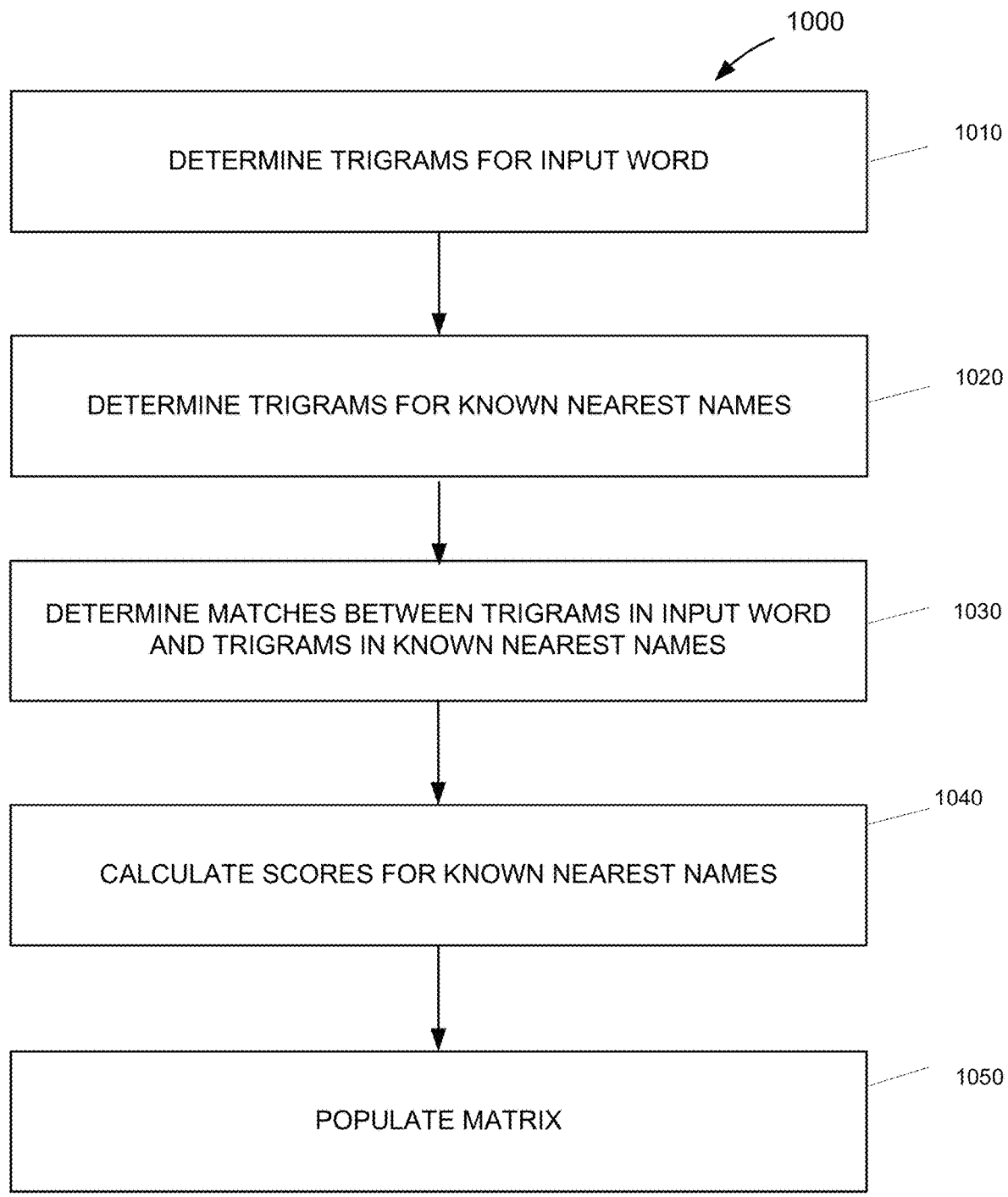
FIG. 10 illustrates a flowchart of a method for calculating classification values, in accordance with some example embodiments.

FIG. 10 illustrates a flowchart of a method 1000 for calculating classification values, in accordance with some example embodiments. The steps performed in FIG. 10 can correspond to step 370 of FIG. 3.

At step 1010, trigrams from an input word are identified. The trigrams wq that are identified can be the trigrams that are identified in step 320 of FIG. 3.

At step 1020, trigrams for the k nearest neighbors that are common to the trigrams for the input word are identified. As shown in FIG. 9, a column 940 represents trigrams of the k nearest neighbors that are common to the trigrams wq of the input word At step 1030, trigrams from the input word are compared with trigrams for each of the k nearest neighbors. A frequency of matches between the trigrams from the input word are compared with trigrams for each of the k nearest neighbors. The frequency of matches can be determined using a counter.

At step 1040, classification values are calculated based on the frequency of matches between trigrams in the input word and trigrams from the k nearest neighbors.

At step 1050, the classification values for the trigrams of the unknown word are populated with the classification values that were calculated. The classification values can be populated in a matrix.

After the classification values of the trigrams have been determined and populated in a matrix, the matrix can be run through a convolutional neural network.

B. Detailed Method of Calculating Classification values

Figure 11:
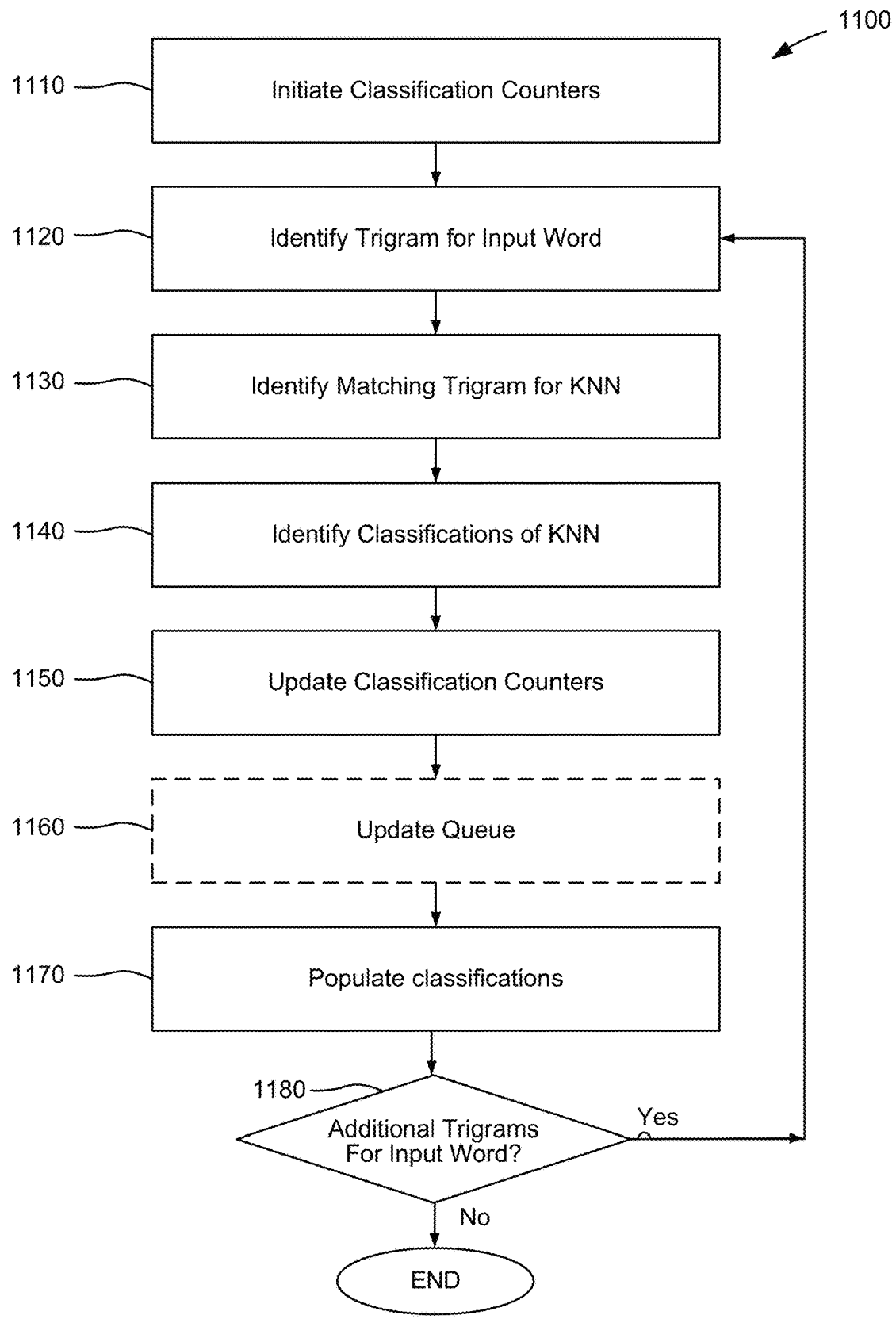
FIG. 11 illustrates a detailed flowchart of a method for calculating classification values, in accordance with some example embodiments.

FIG. 11 illustrates a detailed flowchart of a method 1100 for calculating classification values, in accordance with some example embodiments. The steps performed in FIG. 11 can correspond to step 370 of FIG. 3. FIG. 11 describes the steps performed in FIG. 10 in more detail.

The method shown in FIG. 11 can be represented by the following formula:
Loop through matrix M, row by row
Loop through Q
if wq[0]==Q[i][0]
  pop Q[i]
  increment C[j] associated with S[i]
populate additional columns of matrix M with $\lambda \cdot C[j]/k$ The variable C represents a counter. A counter C can be initiated for each possible classification. The counter can be a temporary counter that is stored temporarily. The counter can be stored, for example, in data store 214. In the example described, there are two classifications to be determined (e.g., male and female) therefore, two counters can be initiated. The variable $\lambda$, is used to scale the additional feature columns. For purposes of example, the variable $\lambda$, is represented by the value 0.001. The value of the variable $\lambda$, is based on the value of the data that needs to be scaled or made to be more easily comparable to the word embedding model vector values. The variable Q represents the list of N queues, as shown in FIG. 9.

The variable Q[i] represents one of the k neighbors. The k neighbors can be obtained using a k Nearest Neighbors (KNN) algorithm. Therefore, Q[i] represents a trigram for one of k neighbor that is common to trigrams wq. The variable j in C[j] represents the classification. Therefore, the variables C[j] represents a counter for a classification.

In the example described, the trigrams wq for the input word w are "^JO, JOA, OAN, ANN, NNA, NA$." The trigrams in Q for the k neighbors are "^JO, JOA, OAN, ANN," "^JO" and "ANN, NNA, NA$." The set of nearest names S includes "JOANNE," JOHN," and "ANNA." Q in this example includes a list of N=3 queues for the three nearest neighbors.

At step 1110, counters C are initiated for each of the possible classifications. The counter can be represented by C[j]. The j represents the classification (e.g., first, second, third, etc.). In the example described, since there are two classifications (e.g., male and female), two counters are initiated. A first counter C[0] can correspond to a first classification (e.g., male) and a second counter C[1] can correspond to a second classification (e.g., female). The counter can be stored on the data store of the neologism classification server. The counter can be removed after each iteration, after a trigram of wq has been analyzed, and a new counter can be initiated.

At step 1120, a trigram (e.g. ^JO) in the matrix M for the input word w is identified or selected for analysis. The method of FIG. 11 will continue to repeat for each trigram wq for the input word. The trigrams in the matrix M for analysis are looped through in order one at a time. Since there are six trigrams in wq "^JO, JOA, OAN, ANN, NNA, NA$" the first trigram to be analyzed is "^JO" and the last trigram to be analyzed is "NA$." Therefore, for an example including six trigrams wq, step 1120-1170 can be repeated six times for each of the trigrams.

At step 1130, a trigram (e.g. ^JO) in the a list of N queues Q for the k nearest neighbors (e.g. JOANNE, JOHN, ANNA) that match the trigram identified at step 1120, are determined. In this example, the trigram ^JO occurs twice. Trigrams of the k nearest names that match the first trigram of the input word are determined. Once for the k nearest neighbor "JOANNE" and once for the k nearest neighbor "JOHN."

At step 1140, the classifications of the matching trigrams of the particular nearest neighbor, that match the trigram from the input word, are determined. The classification of the matching trigram (e.g., ^JO) is identified from, for example, column 960 which indicates a classification for the respective nearest neighbor. Therefore, the classification (e.g., female) of the name "JOANNE" is identified and the classification (e.g., male) of the name "JOHN is identified since both JOANNE and JOHN include the trigram "^JO".

At step 1150, a counter associated with the classifications is incremented. Counters for each of a plurality of classifications that correspond to the determined classification of the one or more trigrams of the k nearest names are incremented. Since the classification for the particular nearest neighbor "JOANNE" is "female" the second counter C[2] for the second classification is incremented. Since the classification for the particular nearest neighbor "JOHN" is "male" the first counter C[1] for the first classification is also incremented.

At step 1160 the list of N queues Q can be updated. The trigrams (e.g., ^JO) that match the input word trigram (e.g., ^JO) can be removed from a list of N queues Q (e.g., for the name "JOANNE" and for the name "JOHN").

At step 1170, the classification values can be populated in the matrix M for the trigram wq that was identified. Therefore, the classification values shown in row 1233 in classification column 1230 of FIG. 12 would be filled in the matrix after step 1170.

In an example embodiment, the classification values are populated after each trigram (e.g., ^JO, JOA, OAN, ANN, NNA, NA$) has been classified. However, the population of the classification values in the matrix Mean be performed after all of the trigrams wq for an input word have been analyzed.

The classification columns can be populated based on the equation $\lambda \cdot C[j]/k$, k being the number or quantity of nearest neighbors. The variable $\lambda$, is used to scale. Scaling is performed so that the classification values are in same order of magnitude as the word embedding model values in columns 1220. The word embedding values in the above example have three leading zeros before the decimal point. If the classification values were not scaled, the extra columns in the classification values could overwhelm the CNN.

At 1180, it is determined whether there are additional trigrams wq for the input word to be analyzed. Steps 1120,

1130, 1140, 1150, 1160 and 1170 are repeated until all of the trigrams wq for the input word have been compared with the trigrams for the k nearest neighbors. That is, steps 1120, 1130, 1140, 1150, 1160 and 1170 are repeated until all of the trigrams wq for the input word w "JOANNA" have been compared with all of the trigrams in a list of N queues Q for the k nearest neighbors.

When there are additional trigrams wq for the input word w to be analyzed, then step 1020 is repeated for the next trigram in wq. For example, the next trigram to be analyzed in wq is "JOA."

When it is determined at step 1180, that there are no additional trigrams wq for the input word w to be analyzed, then the process ends.

C. Matrix Populated with Classification Values

FIG. 12 illustrates the matrix M that is completed to include classification values, in accordance with some example embodiments. The matrix M shown in FIG. 12 is the populated matrix after performing the methods shown in FIGS. 10 and 11.

As shown in FIG. 12, the first classification column 1231 includes the values "0.3, 0.1, 0.0, 0.0, 0.0, 0.0" for the trigrams "^JO, JOA, OAN, ANN, NNA, NA$" respectively. The second classification column 1232 includes the values "0.1, 0.4, 0.3, 0.5, 0.3, 0.3" for the trigrams "^JO, JOA, OAN, ANN, NNA, NA$" respectively.

Based on the classification results, the second classification column 1232 is resulting in higher values than the first classification column 1231. Therefore, the input word "JOANNA" more likely falls under the second classification (e.g., female).

However, to ensure accuracy in the classification results, the matrix M will be run through a CNN. The output from the CNN is a softmax vector of length n where n is the number of possible classifications. A softmax function is a function that can take a vector z of K real numbers as an input, and normalize the input into a probability distribution consisting of K probabilities proportional to the exponentials of the input numbers. In a softmax vector, each component represents the probability (between 0.0 and 1.0) of the sample being in that class. Often, the class with the greatest probability is selected to be the prediction and the other probabilities are ignored.

VI. Convolutional Neural Network

Figure 13:
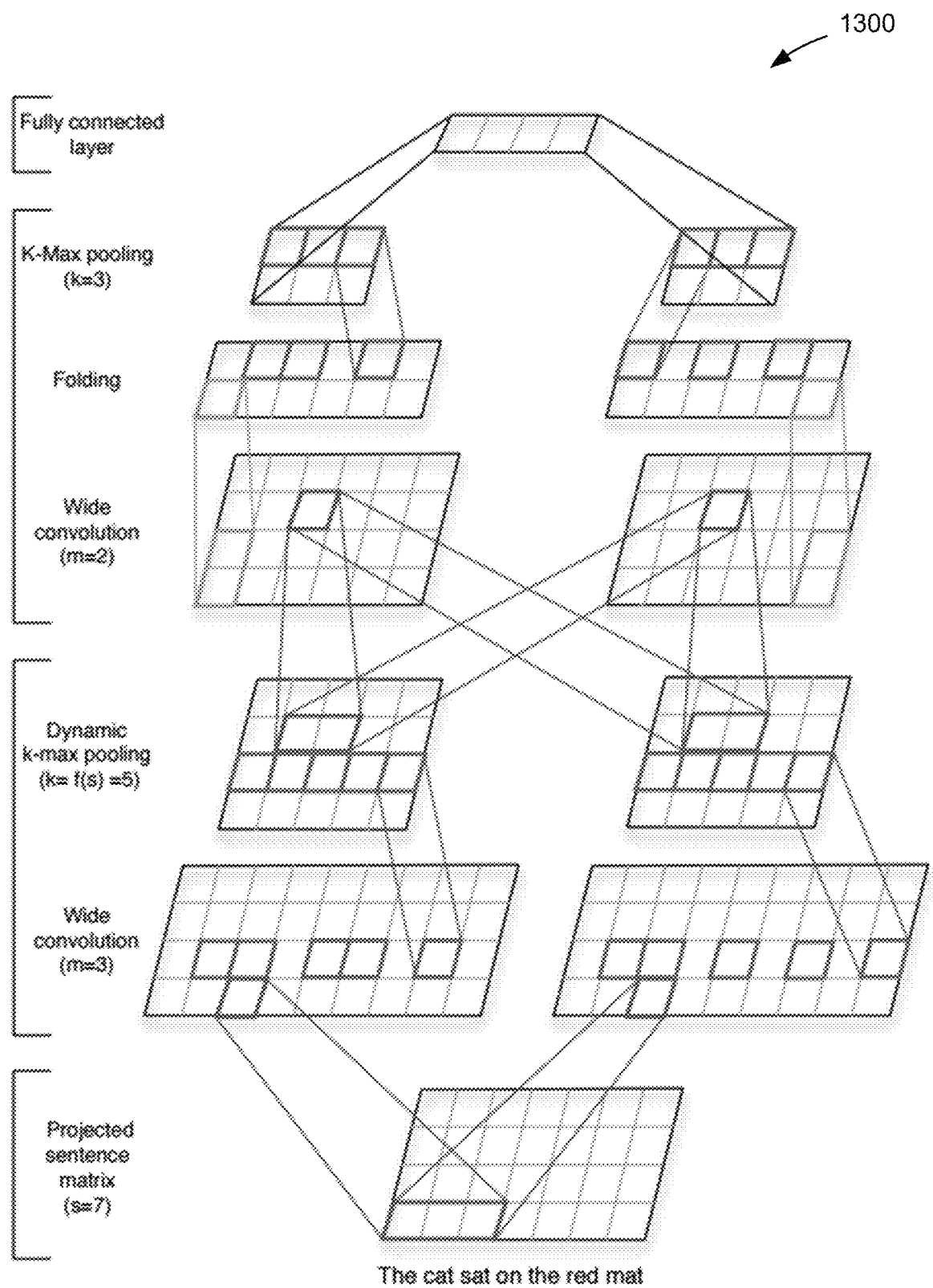
FIG. 13 illustrates a convolutional neural network, in accordance with some example embodiments.

FIG. 13 illustrates a convolutional neural network 1300, in accordance with some example embodiments.

FIG. 13 illustrates an example of a standard convolutional neural network. A convolutional neural network (CNN) for modeling sentences can use techniques in "A Convolutional Neural Network for Modelling Sentences" (2014) by Kalchbrenner, which is incorporated by reference for all purposes. The CNN may be implemented using one-dimensional convolutional layers. The CNN may be implemented using a package or library provided by a third party (e.g., GitHub). The package may be Keras implemented using Python and/or DeepLearning4J for Java and Scala. Further the CNN can be, for example, a three-layer or a seven-layer CNN. These are merely examples, and different CNN's can be used. Further, the CNN may be created independently by the user.

In at least one embodiment, the array with reference to vectors for each message may be used with a CNN technique to determine sentiment analysis. Examples of techniques may be implemented based on those found at "Understanding Convolutional Neural Networks for NLP", Denny's Blog, Feb. 11, 2022, and Keras Team keras examples on GitHub (2017), which are incorporated by reference for all purposes. Values for variables filter length=3, CNNDense-Dropout=0.2, dense_dims=20, batch_size=10, nb_epoch=5, validation_split=0.1 may be set for implementing the CNN technique. The CNN may be implemented based on the data structures for the words as a one-dimensional structure.

By executing the CNN based on the function calls, the training data is executed for testing using the CNN to perform initial sentiment analysis.

VII. User Interface

Figure 14:
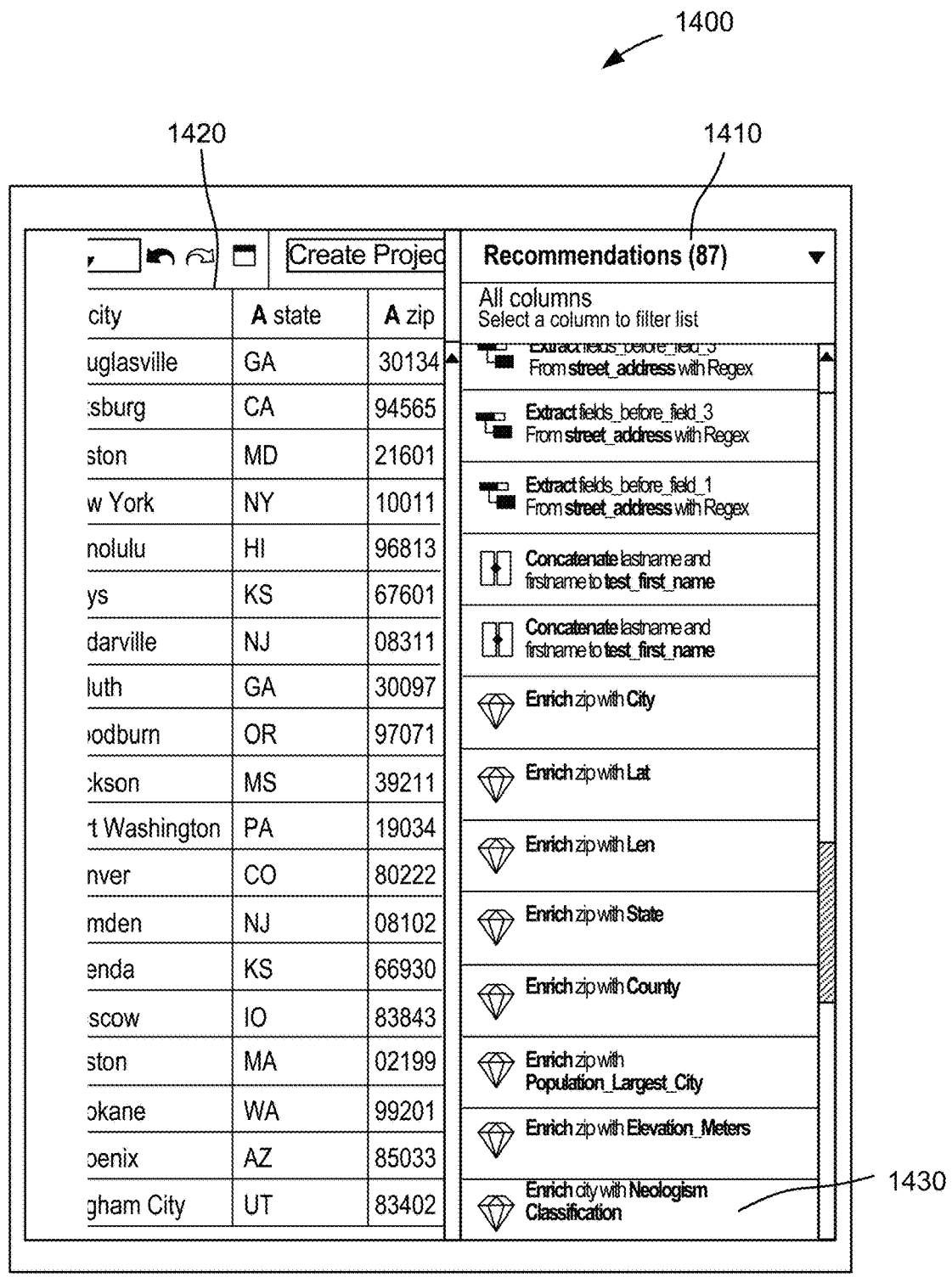
FIG. 14 illustrates a user interface for performing neologism classification, in accordance with some example embodiments.

FIG. 14 illustrates a user interface 1400 for performing neologism classification, in accordance with some example embodiments.

The user interface 1400 can be displayed on a display of the data enrichment system 120 of the analytics system 110 shown in FIG. 1. The user interface 1400 includes a plurality of columns 1420 of data from a dataset. The dataset can include, for example, customer information, or other types of data that are available in spreadsheets. In the example shown in FIG. 14, the customer information includes city name, state and zip code. However, this is merely an example and datasets can include various types of information.

A user can input a dataset for which neologism classification is to be performed. For example, a user can select a dataset on an interactive user interface of the data enrichment system. The user interface can display a plurality of data source options from which datasets can be obtained. A user can upload a dataset that they would like to enrich, analyze or visualize. The dataset can be in the form of columns such as a spreadsheet.

The user interface 1400 includes a recommendations panel 1410. The recommendations panel provides the user with one or more recommendations of actions to apply to the dataset. For example, recommendations can include enriching data by determining neologism for a column of data. Recommendations can include enriching data by performing neologism classifications for one or more columns of data in a dataset. For example, a user can selection recommendation 1430 to enrich a city column of the data set by performing neologism classification.

The data enrichment system is configured to provide recommendations for performing processes on the dataset such as enriching the data. That is, the data enrichment system can analyze the dataset and provide the user with recommended actions for the dataset to enrich the data. The data enrichment system can automatically determine, based on the dataset provided, what enrichment would be beneficial to the data.

Given the dataset, part of which is shown in panel 1410, the user can be provided with a recommendation to enrich a column of the data by selecting to perform neologism classification (element 1430). FIG. 14 illustrates a simplified view of a user interface on which a user can select to perform neologism classification. Additional displays may be provided or the user may be prompted to provide additional information before the neologism classification is performed.

Therefore, in an example embodiment, if the dataset includes data for which neologism classification can be performed, the data enrichment system may suggest that the user perform neologism classification. When the user selects to perform neologism classification (e.g., select element 1430), the neologism classification can be implemented for the selected column of data.

An example embodiment provides systems, methods and computer readable media with improved accuracy. Therefore, example embodiments provide improvements in determining the classification of neologisms.

Since example embodiments provide highly accurate classifications, data that is provided to users of the data enrichment system can be more complete. The data is thereby made more useful to users.

An example embodiment can include a combination of trigrams, word embedding models (e.g., Word2Vec) for trigrams, k nearest names (e.g., StatSim), additional classifications (e.g. male/female) with counters, and a convolutional neural network (CNN).

Trigrams provide improved results in accurately determining characteristics associated with a neologism. Meaning is inferred from the order of the trigrams and not just the values of the trigrams themselves.

Further, example embodiments use a combination of word embedding model CNN on trigrams. Additional columns are added to the right side of the matrix for additional features.

VIII. Hardware Overview

Figure 15:
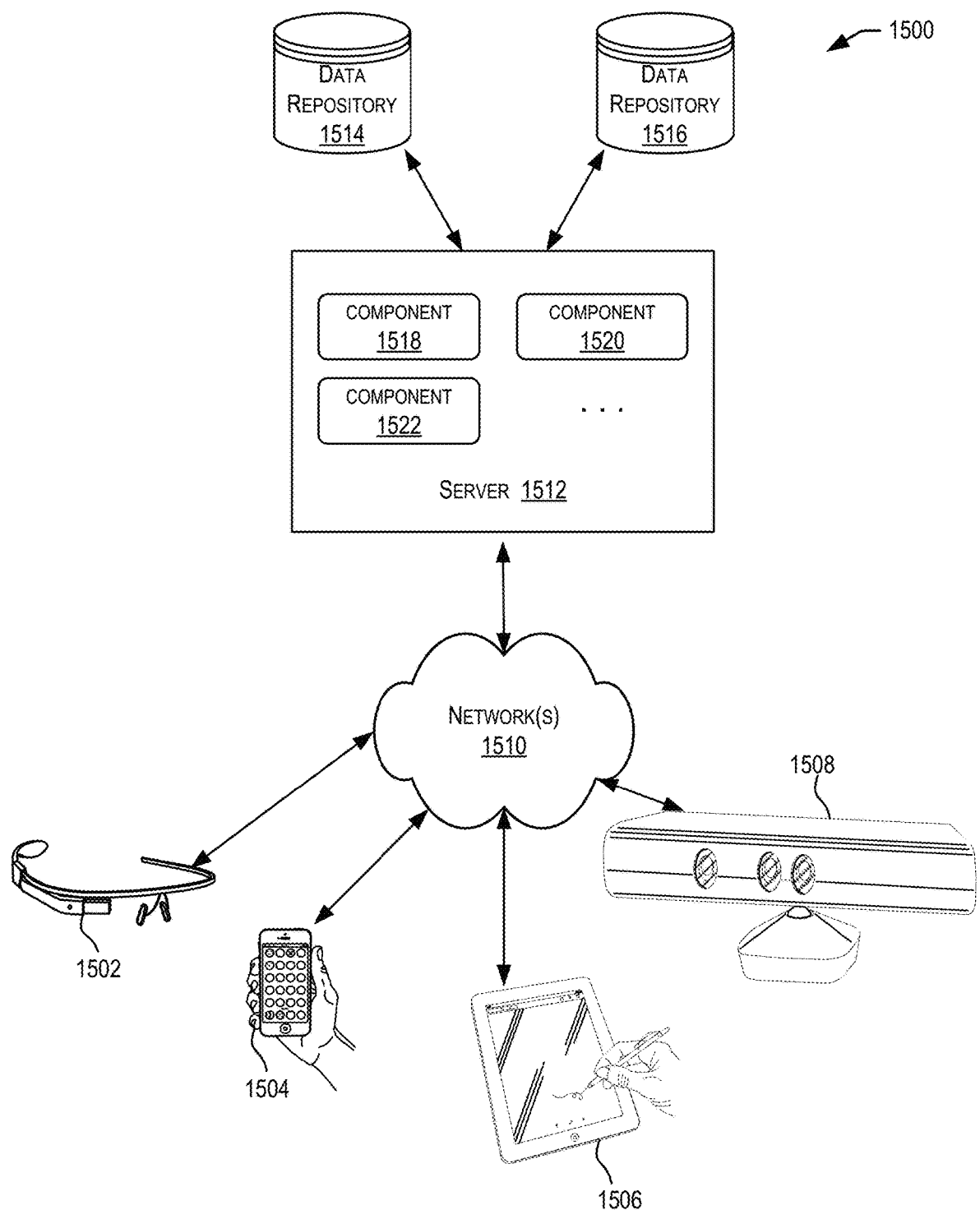
FIG. 15 depicts a simplified diagram of a distributed system, in accordance with some example embodiments.

FIG. 15 depicts a simplified diagram of a distributed system 1500 for implementing an embodiment. In the illustrated embodiment, distributed system 1500 includes one or more client computing devices 1502, 1504, 1506, and 1508, coupled to a server 1512 via one or more communication networks 1510. Clients computing devices 1502, 1504, 1506, and 1508 may be configured to execute one or more applications.

In various embodiments, server 1512 may be adapted to run one or more services or software applications that enable automated generation of regular expressions, as described in this disclosure. For example, in certain embodiments, server 1512 may receive user input data transmitted from a client device, where the user input data is received by the client device through a user interface displayed at the client device. Server 1512 may then convert the user input data into a regular expression that is transmitted to the client device for display through the user interface.

In certain embodiments, server 1512 may also provide other services or software applications that can include non-virtual and virtual environments. In some embodiments, these services may be offered as web-based or cloud services, such as under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in FIG. 15, server 1512 may include one or more components 1518, 1520 and 1522 that implement the functions performed by server 1512. These components may include software components that may be executed by one or more processors, hardware components, or combinations thereof. It should be appreciated that various different system configurations are possible, which may be different from distributed system 1500. The embodiment shown in FIG. 15 is thus one example of a distributed system for implementing an embodiment system and is not intended to be limiting.

Users may use client computing devices 1502, 1504, 1506, and/or 1508 to execute one or more applications, which may generate regular expressions in accordance with the teachings of this disclosure. A client device may provide an interface that enables a user of the client device to interact with the client device. The client device may also output information to the user via this interface. Although FIG. 15 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g.,) iPad®, personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1512 can include one or more virtual machines running virtual operating systems, or other computing architectures involving virtualization such as one or more flexible pools of logical storage devices that can be virtualized to maintain virtual storage devices for the server. In various embodiments, server 1512 may be adapted to run one or more services or software applications that provide the functionality described in the foregoing disclosure.

The computing systems in server 1512 may run one or more operating systems including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more data repositories 1514, 1516. These data repositories may be used to store data and other information in certain embodiments. For example, one or more of the data repositories 1514, 1516 may be used to store information such as a new column of data that matches a system-generated regular expression. Data repositories 1514, 1516 may reside in a variety of locations. For example, a data repository used by server 1512 may be local to server 1512 or may be remote from server 1512 and in communication with server 1512 via a network-based or dedicated connection. Data repositories 1514, 1516 may be of different types. In certain embodiments, a data repository used by server 1512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1514, 1516 may also be used by applications to store application data. The data repositories used by applications may be of different types such as, for example, a key-value store repository, an object store repository, or a general storage repository supported by a file system.

Figure 16:
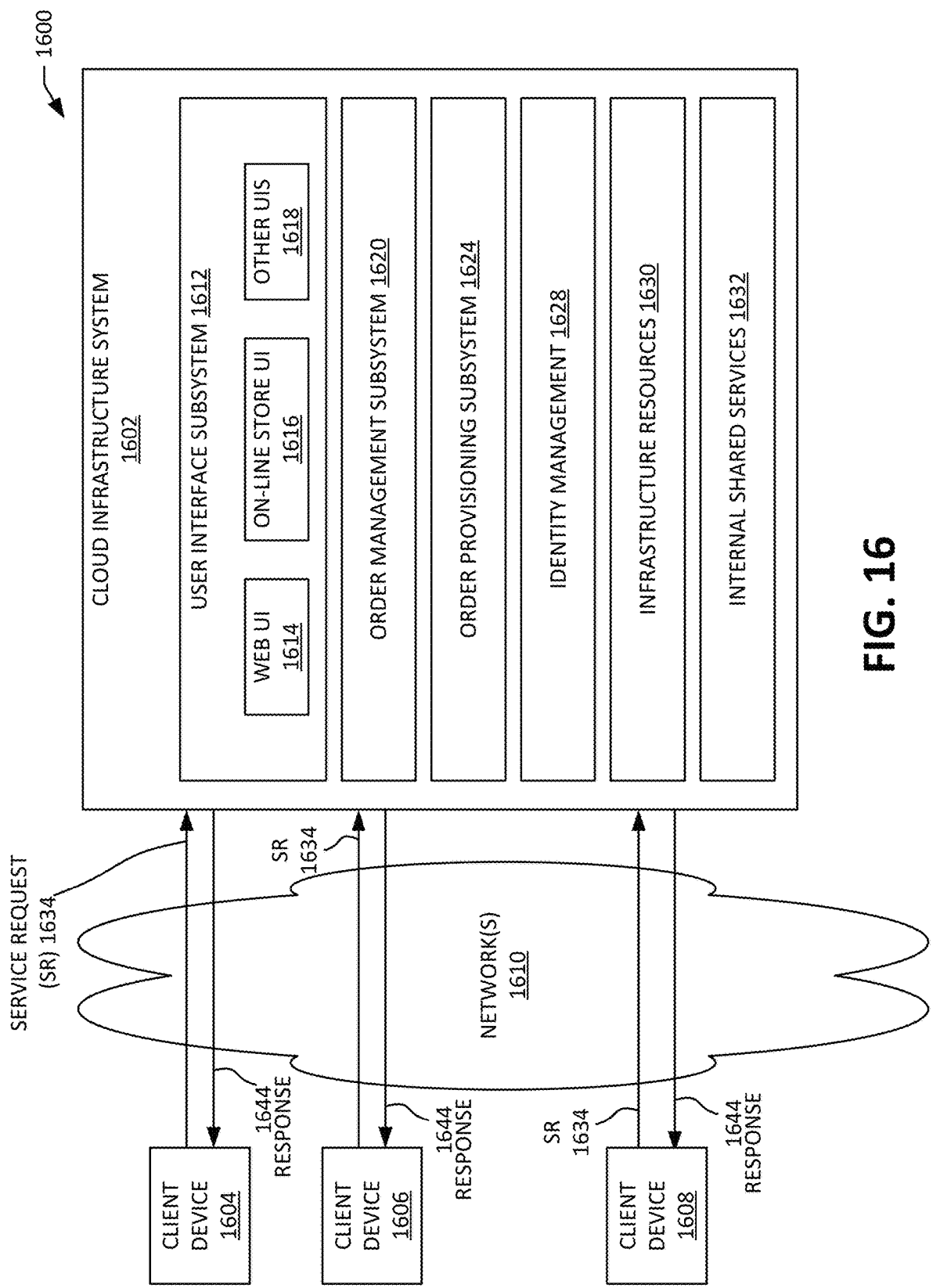
FIG. 16 illustrates a simplified block diagram of one or more components of a system environment in which services may be offered as cloud services, in accordance with some example embodiments.

In certain embodiments, the functionalities described in this disclosure may be offered as services via a cloud environment. FIG. 16 is a simplified block diagram of a cloud-based system environment 1600 in which various services may be offered as cloud services, in accordance with certain examples. In the example depicted in FIG. 16, cloud infrastructure system 1602 may provide one or more cloud services that may be requested by users using one or more client computing devices 1604, 1606, and 1608. Cloud infrastructure system 1602 may comprise one or more computers and/or servers that may include those described above for server 1512. The computers in cloud infrastructure system 1602 may be organized as general purpose computers, specialized server computers, server farms, server clusters, or any other appropriate arrangement and/or combination.

Network(s) 1610 may facilitate communication and exchange of data between clients 1604, 1606, and 1608 and cloud infrastructure system 1602. Network(s) 1610 may include one or more networks. The networks may be of the same or different types. Network(s) 1610 may support one or more communication protocols, including wired and/or wireless protocols, for facilitating the communications.

The example depicted in FIG. 16 is only one example of a cloud infrastructure system and is not intended to be limiting. It should be appreciated that, in some other examples, cloud infrastructure system 1602 may have more or fewer components than those depicted in FIG. 16, may combine two or more components, or may have a different configuration or arrangement of components. For example, although FIG. 16 depicts three client computing devices, any number of client computing devices may be supported in alternative examples.

The term cloud service is generally used to refer to a service that is made available to users on demand and via a communication network such as the Internet by systems (e.g., cloud infrastructure system 1602) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1602. Cloud infrastructure system 1602 then performs processing to provide the services requested in the customer's subscription order. Cloud infrastructure system 1602 may be configured to provide one or more cloud services.

Cloud infrastructure system 1602 may provide the cloud services via different deployment models. In a public cloud model, cloud infrastructure system 1602 may be owned by a third party cloud services provider and the cloud services are offered to any general public customer, where the customer may be an individual or an enterprise. Under a private cloud model, cloud infrastructure system 1602 may be operated within an organization (e.g., within an enterprise organization) and services provided to customers that are within the organization. For example, the customers may be various departments of an enterprise such as the Human Resources department, the Payroll department, etc. or even individuals within the enterprise. Under a community cloud model, the cloud infrastructure system 1602 and the services provided may be shared by several organizations in a related community. Various other models such as hybrids of the above mentioned models may also be used.

Client computing devices 1604, 1606, and 1608 may be of different types (such as devices 1502, 1504, 1506, and 1508 depicted in FIG. 15) and may be capable of operating one or more client applications. A user may use a client device to interact with cloud infrastructure system 1602, such as to request a service provided by cloud infrastructure system 1602.

In some embodiments, the processing performed by cloud infrastructure system 1602 for providing management-related services may involve big data analysis. This analysis may involve using, analyzing, and manipulating large datasets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1602 for determining regular expressions in an automated manner. The data used for this analysis may include structured data (e.g., data stored in a database or structured according to a structured model) and/or unstructured data (e.g., data blobs (binary large objects)).

As depicted in the example in FIG. 16, cloud infrastructure system 1602 may include infrastructure resources 1630 that are utilized for facilitating the provision of various cloud services offered by cloud infrastructure system 1602. Infrastructure resources 1630 may include, for example, processing resources, storage or memory resources, networking resources, and the like.

In certain embodiments, to facilitate efficient provisioning of these resources for supporting the various cloud services provided by cloud infrastructure system 1602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1602 may itself internally use services 1632 that are shared by different components of cloud infrastructure system 1602 and which facilitate the provisioning of services by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1602 may comprise multiple subsystems. These subsystems may be implemented in software, or hardware, or combinations thereof. As depicted in FIG. 16, the subsystems may include a user interface subsystem 1612 that enables users or customers of cloud infrastructure system 1602 to interact with cloud infrastructure system 1602. User interface subsystem 1612 may include various different interfaces such as a web interface 1614, an online store interface 1616 where cloud services provided by cloud infrastructure system 1602 are advertised and are purchasable by a consumer, and other interfaces 1618. For example, a customer may, using a client device, request (service request 1634) one or more services provided by cloud infrastructure system 1602 using one or more of interfaces 1614, 1616, and 1618. For example, a customer may access the online store, browse cloud services offered by cloud infrastructure system 1602, and place a subscription order for one or more services offered by cloud infrastructure system 1602 that the customer wishes to subscribe to. The service request may include information identifying the customer and one or more services that the customer desires to subscribe to. For example, a customer may place a subscription order for an automated-generation-of-regular-expressions-related service offered by cloud infrastructure system 1602.

In certain embodiments, such as the example depicted in FIG. 16, cloud infrastructure system 1602 may comprise an order management subsystem (OMS) 1620 that is configured to process the new order. As part of this processing, OMS 1620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1620 may then invoke the order provisioning subsystem (OPS) 1624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1602 may send a response or notification 1644 to the requesting customer to indicate when the requested service is now ready for use. In some instances, information (e.g., a link) may be sent to the customer that enables the customer to start using and availing the benefits of the requested services. In certain embodiments, for a customer requesting the automated-generation-of-regular-expressions-related service, the response may include instructions which, when executed, cause display of a user interface.

Cloud infrastructure system 1602 may provide services to multiple customers. For each customer, cloud infrastructure system 1602 is responsible for managing information related to one or more subscription orders received from the customer, maintaining customer data related to the orders, and providing the requested services to the customer. Cloud infrastructure system 1602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1602 may provide services to multiple customers in parallel. Cloud infrastructure system 1602 may store information for these customers, including possibly proprietary information. In certain embodiments, cloud infrastructure system 1602 comprises an identity management subsystem (IMS) 1628 that is configured to manage customer information and provide the separation of the managed information such that information related to one customer is not accessible by another customer. IMS 1628 may be configured to provide various security-related services such as identity services; information access management, authentication and authorization services; services for managing customer identities and roles and related capabilities, and the like.

Figure 17:
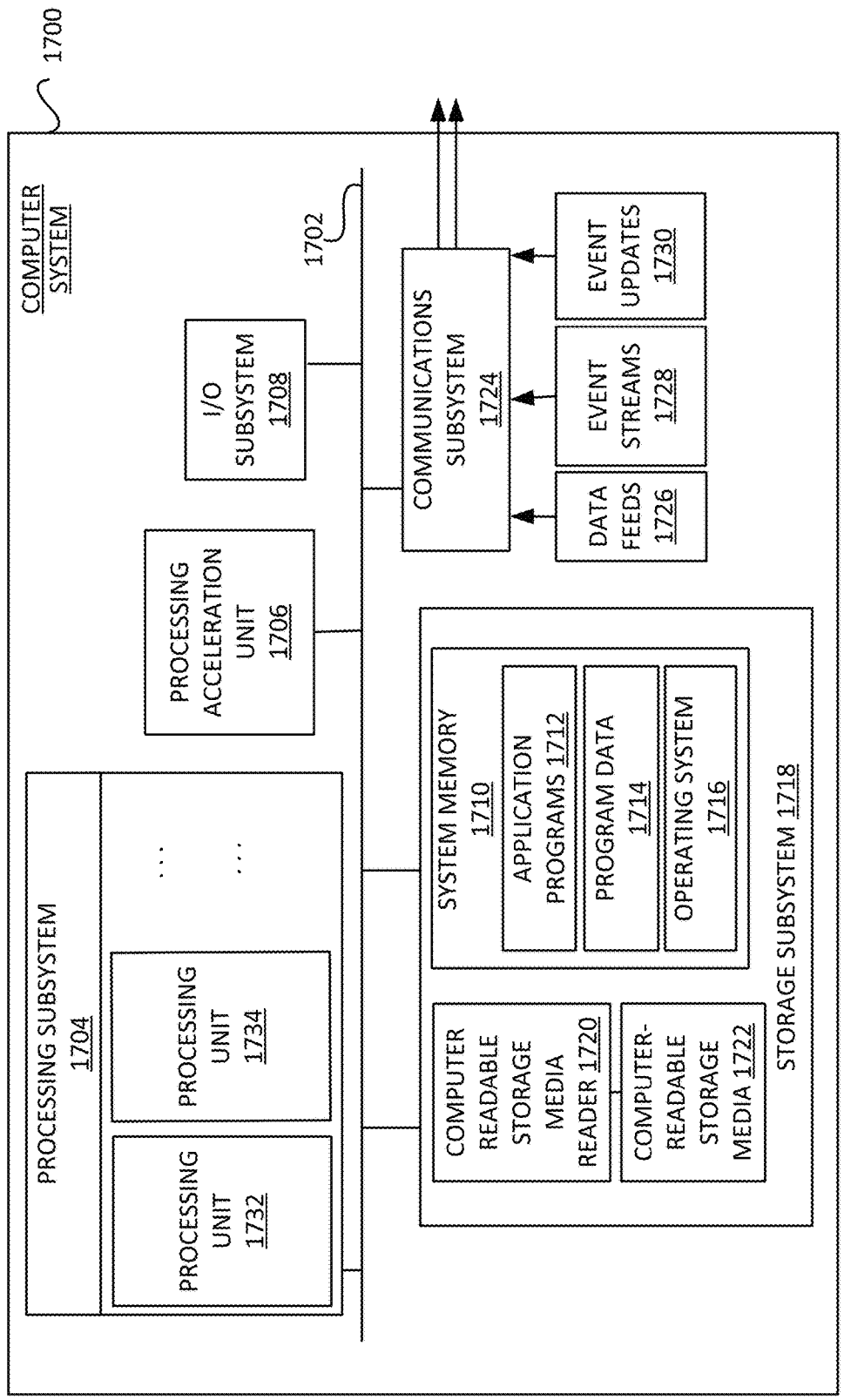
FIG. 17 illustrates an exemplary computer system that may be used to implement an example embodiment, in accordance with some example embodiments.

FIG. 17 illustrates an example of computer system 1700, in accordance with some example embodiments. In some embodiments, computer system 1700 may be used to implement any of the systems described above. As shown in FIG. 17, computer system 1700 includes various subsystems including a processing subsystem 1704 that communicates with a number of other subsystems via a bus subsystem 1702. These other subsystems may include processing acceleration unit 1706, I/O subsystem 1708, storage subsystem 1718, and communications subsystem 1724. Storage subsystem 1718 may include non-transitory computer-readable storage media including storage media 1722 and system memory 1710.

Bus subsystem 1702 provides a mechanism for letting the various components and subsystems of computer system 1700 communicate with each other as intended. Although bus subsystem 1702 is shown schematically as a single bus, alternative examples of the bus subsystem may utilize multiple buses. Bus subsystem 1702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1704 controls the operation of computer system 1700 and may comprise one or more processors, application specific integrated circuits (ASICs), or field programmable gate arrays (FPGAs). The processors may include be single core or multicore processors. The processing resources of computer system 1700 may be organized into one or more processing units 1732, 1734, etc. A processing unit may include one or more processors, one or more cores from the same or different processors, a combination of cores and processors, or other combinations of cores and processors. In some embodiments, processing subsystem 1704 may include one or more special purpose co-processors such as graphics processors, digital signal processors (DSPs), or the like. In some embodiments, some or all of the processing units of processing subsystem 1704 may be implemented using customized circuits, such as application specific integrated circuits (ASICs), or field programmable gate arrays (FPGAs).

In some embodiments, the processing units in processing subsystem 1704 may execute instructions stored in system memory 1710 or on computer readable storage media 1722. In various examples, the processing units may execute a variety of programs or code instructions and may maintain multiple concurrently executing programs or processes. At any given time, some or all of the program code to be executed may be resident in system memory 1710 and/or on computer-readable storage media 1722 including potentially on one or more storage devices. Through suitable programming, processing subsystem 1704 may provide various functionalities described above. In instances where computer system 1700 is executing one or more virtual machines, one or more processing units may be allocated to each virtual machine.

In certain embodiments, a processing acceleration unit 1706 may optionally be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term input device is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1718 provides a repository or data store for storing information and data that is used by computer system 1700. Storage subsystem 1718 provides a tangible non-transitory computer-readable storage medium for storing the basic programming and data constructs that provide the functionality of some examples. Storage subsystem 1718 may store software (e.g., programs, code modules, instructions) that when executed by processing subsystem 1704 provides the functionality described above. The software may be executed by one or more processing units of processing subsystem 1704. Storage subsystem 1718 may also provide a repository for storing data used in accordance with the teachings of this disclosure.

Storage subsystem 1718 may include one or more non-transitory memory devices, including volatile and non-volatile memory devices. As shown in FIG. 17, storage subsystem 1718 includes system memory 1710 and computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM), dynamic random access memory (DRAM), and the like.

By way of example, and not limitation, as depicted in FIG. 17, system memory 1710 may load application programs 1712 that are being executed, which may include various applications such as Web browsers, mid-tier applications, relational database management systems (RDBMS), etc., program data 1714, and operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1722 may store programming and data constructs that provide the functionality of some examples. Computer-readable media 1722 may provide storage of computer-readable instructions, data structures, program modules, and other data for computer system 1700. Software (programs, code modules, instructions) that, when executed by processing subsystem 1704 provides the functionality described above, may be stored in storage subsystem 1718. By way of example, computer-readable storage media 1722 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1718 may also include computer-readable storage media reader 1720 that may further be connected to computer-readable storage media 1722. Reader 1720 may receive and be configured to read data from a memory device such as a disk, a flash drive, etc.

In certain embodiments, computer system 1700 may support virtualization technologies, including but not limited to virtualization of processing and memory resources. For example, computer system 1700 may provide support for executing one or more virtual machines. In certain embodiments, computer system 1700 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1700. Accordingly, multiple operating systems may potentially be run concurrently by computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client devices via the Internet for receiving and sending information from and to the client devices.

Communication subsystem 1724 may support both wired and/or wireless communication protocols. In certain embodiments, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1724 may provide wired network connectivity (e.g., Ethernet) in addition to or instead of a wireless interface.

Communication subsystem 1724 may receive and transmit data in various forms. In some embodiments, in addition to other forms, communications subsystem 1724 may receive input communications in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to communicate data from computer system 1700 to other computer systems or networks. The data may be communicated in various different forms such as structured and/or unstructured data feeds 1726, event streams 1728, event updates 1730, and the like to one or more databases that may be in communication with one or more streaming data source computers coupled to computer system 1700.

Computer system 1700 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

What is claimed is:

1. A method comprising
   receiving, by a server computer comprising a processor and a memory, an input word comprising a first string of characters;
   determining, by the server computer, a first plurality of trigrams for the input word;
   calculating, by the server computer, word embedding vector values for the determined first plurality of trigrams;
   inputting, by the server computer, the word embedding vector values in a matrix
   determining, by the server computer, a plurality of nearest names, wherein the plurality of nearest names are names having a second string of characters that are similar to the first string of characters of the input word;
   determining, by the server computer, a second plurality of trigrams for the nearest names;
   determining, by the server computer, longest common subsequences between the first plurality of trigrams of the input word and the second plurality of trigrams of the nearest names;
   calculating, by the server computer, classification values for the first plurality of trigrams;
   updating, by the server computer, the matrix to include the calculated classification values; and
   running, by the server computer, the updated matrix through a convolutional neural network to determine a classification of the input word.

2. The method according to claim 1, wherein the input word is a neologism.

3. The method according to claim 1, wherein the calculating the classification values comprises:
   identifying the first plurality of trigrams from the input word;
   identifying the second plurality of trigrams from the nearest names;
   comparing the first plurality of trigrams from the input word with the second plurality of trigrams from the nearest names; and
   calculating the classification values based on a number of matches between the first plurality of trigrams in the input word and the second plurality of trigrams from the nearest names.

4. The method according to claim 1, wherein the calculating the classification values comprises:
   initiating counters for each of a plurality of classifications;
   selecting a first trigram from the first plurality of trigrams of the input word;
   determining one or more trigrams from the second plurality of trigrams of the nearest names that match the first trigram of the input word;
   determine a classification of the one or more trigrams from the second plurality of trigrams of the nearest names that match the first trigram of the input word;
   incrementing the counters for each of the plurality of classifications that correspond to the determined classification of the one or more trigrams from the second plurality of trigrams of the nearest names; and
   calculating the classification values based on a value of the counters with respect to a number of the determined nearest names.

5. The method according to claim 1, wherein the word embedding vector model is trained according to a type of the input word.

6. The method according to claim 1, wherein the word embedding model is trained to calculate word embedding model vector values for trigrams.

7. The method according to claim 1, wherein a trigram of the first plurality of trigrams comprises three letters, characters or symbols in consecutive order from the input word.

8. The method according to claim 1, wherein the server computer is a neologism classification server of a data enrichment system.

9. The method according to claim 8, wherein the input word is received on an interactive user interface of the data enrichment system that is configured to enrich the input word.

10. The method according to claim 9, wherein the interactive user interface is configured to display a recommendation to perform neologism classification for one or more input words.

11. The method according to claim 1, wherein after calculating the vector values for the determined first plurality of trigrams:
    initiating the matrix; and
    populating the matrix with the calculated word embedding vector values.

12. A server computer comprising:
    a processor;
    a memory;
    a computer readable medium coupled to the processor, the computer readable medium storing instructions executable by the processor for implementing a method comprising:

receiving an input word comprising a first string of characters;

determining a first plurality of trigrams for the input word;

calculating word embedding vector values for the determined first plurality of trigrams;

inputting the word embedding vector values in a matrix determining a plurality of nearest names, wherein the plurality of nearest names are names having a second string of characters that are similar to the first string of characters of the input word;

determining a second plurality of trigrams for the nearest names;

determining longest common subsequences between the first plurality of trigrams of the input word and the second plurality of trigrams of the nearest names;

calculating classification values for the first plurality of trigrams;

updating the matrix to include the calculated classification values; and running the updated matrix through a convolutional neural network to determine a classification of the input word.

13. The server computer according to claim 12, wherein the input word is a neologism.

14. The server computer according to claim 12, wherein the calculating the classification values comprises:

identifying the first plurality of trigrams from the input word;

identifying the second plurality of trigrams from the nearest names;

comparing the first plurality of trigrams from the input word with the second plurality of trigrams from the nearest names; and calculating the classification values based on a number of matches between the first plurality of trigrams in the input word and the second plurality of trigrams from the nearest names.

15. The server computer according to claim 12, wherein the calculating the classification values comprises:

initiating counters for each of a plurality of classifications;

selecting a first trigram from the first plurality of trigrams of the input word;

determining one or more trigrams from the second plurality of trigrams of the nearest names that match the first trigram of the input word;

determine a classification of the one or more trigrams from the second plurality of trigrams of the nearest names that match the first trigram of the input word;

incrementing the counters for each of the plurality of classifications that correspond to the determined classification of the one or more trigrams from the second plurality of trigrams of the nearest names; and calculating the classification values based on a value of the counters with respect to a number of the determined nearest names.

16. The server computer according to claim 12, wherein the word embedding model is trained to calculate word embedding model vector values for trigrams.

17. A non-transitory computer readable medium including instructions configured to cause one or more processors of a server computer to perform operations comprising:

receiving an input word comprising a first string of characters;

determining a first plurality of trigrams for the input word;

calculating word embedding vector values for the determined first plurality of trigrams;

inputting the word embedding vector values in a matrix determining a plurality of nearest names, wherein the plurality of nearest names are names having a second string of characters that are similar to the first string of characters of the input word;

determining a second plurality of trigrams for the nearest names;

determining longest common subsequences between the first plurality of trigrams of the input word and the second plurality of trigrams of the nearest names;

calculating classification values for the first plurality of trigrams;

updating the matrix to include the calculated classification values; and running the updated matrix through a convolutional neural network to determine a classification of the input word.

18. The non-transitory computer readable medium according to claim 17, wherein the input word is a neologism.

19. The non-transitory computer readable medium according to claim 17, wherein the calculating the classification values comprises:

identifying the first plurality of trigrams from the input word;

identifying the second plurality of trigrams from the nearest names;

comparing the first plurality of trigrams from the input word with the second plurality of trigrams from the nearest names; and calculating the classification values based on a number of matches between the first plurality of trigrams in the input word and the second plurality of trigrams from the nearest names.

20. The non-transitory computer readable medium according to claim 17, wherein the calculating the classification values comprises:

initiating counters for each of a plurality of classifications;

selecting a first trigram from the first plurality of trigrams of the input word;

determining one or more trigrams from the second plurality of trigrams of the nearest names that match the first trigram of the input word;

determine a classification of the one or more trigrams from the second plurality of trigrams of the nearest names that match the first trigram of the input word;

incrementing the counters for each of the plurality of classifications that correspond to the determined classification of the one or more trigrams from the second plurality of trigrams of the nearest names; and calculating the classification values based on a value of the counters with respect to a number of the determined nearest names.

\* \* \* \* \*

UNITED STATES PATENT AND TRADEMARK OFFICE
CERTIFICATE OF CORRECTION

| | |
|---|---|
| PATENT NO. | : 11,694,029 B2 |
| APPLICATION NO. | : 16/985131 |
| DATED | : July 4, 2023 |
| INVENTOR(S) | : Malak et al. |

It is certified that error appears in the above-identified patent and that said Letters Patent is hereby corrected as shown below:

On the Title Page

On page 2, Column 2, under Other Publications, Line 2, delete "FastText," and insert -- Fast Text, -- therefor.

On page 2, Column 2, under Other Publications, Line 8, delete "Pattem" and insert -- Pattern -- therefor.

On page 2, Column 2, under Other Publications, Line 19, delete "Vectorsand" and insert -- Vectors and -- therefor.

In the Specification

In Column 9, Line 6, delete "Nin" and insert -- N in -- therefor.

In Column 9, Line 9, delete "Nin" and insert -- N in -- therefor.

In Column 15, Line 3, delete "word" and insert -- word. -- therefor.

In Column 16, Line 15, delete "the a" and insert -- the -- therefor.

In Column 29, Line 11, delete "evolution)," and insert -- evolution)), -- therefor.

Signed and Sealed this
Twenty-eighth Day of May, 2024

*Katherine Kelly Vidal*
Katherine Kelly Vidal
*Director of the United States Patent and Trademark Office*